July 30, 1968 J. B. SPELLER 3,395,270
RELATIVISTIC INERTIAL REFERENCE DEVICE
Filed June 28, 1962 8 Sheets-Sheet 1
FIG. I
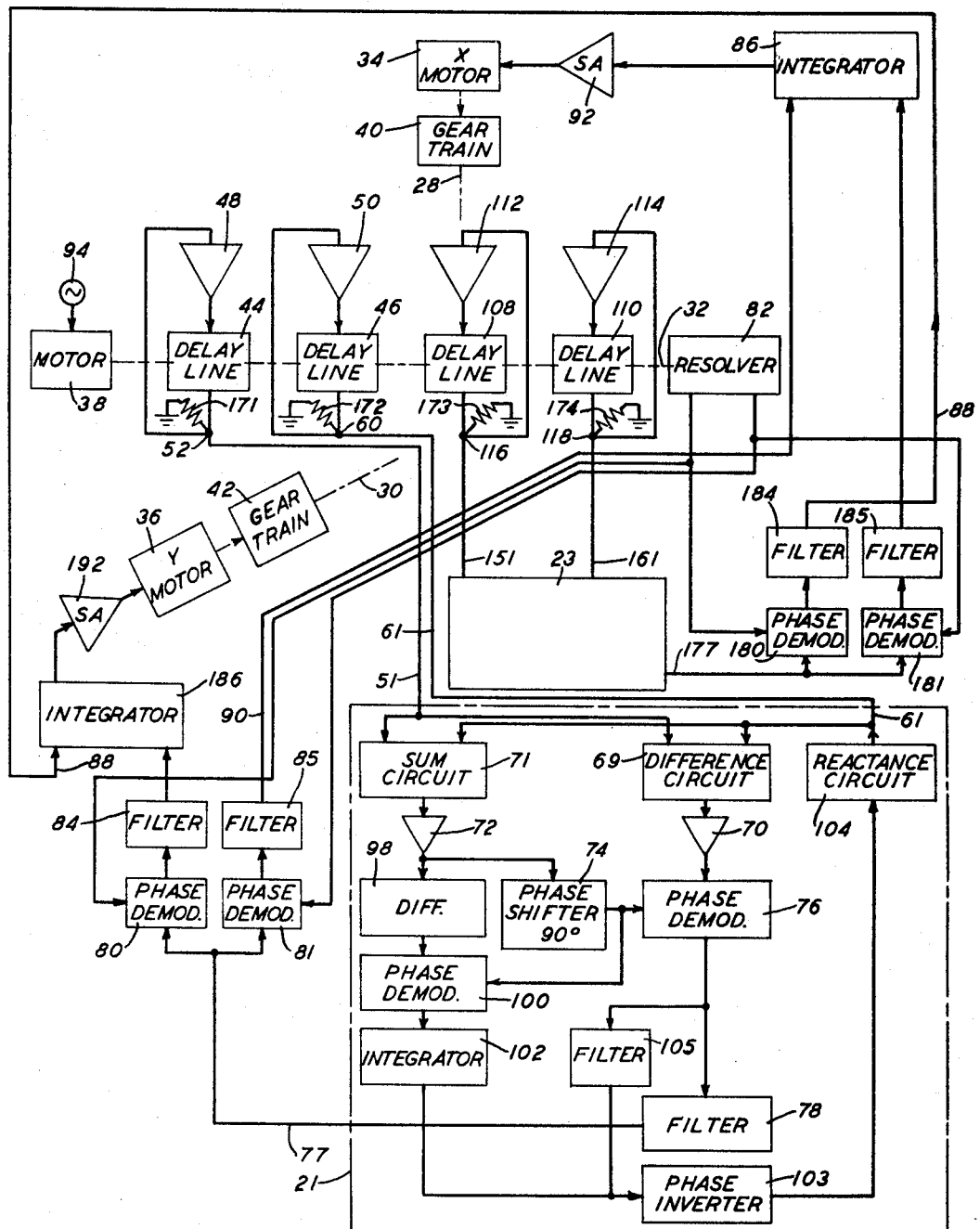
FIG. IB
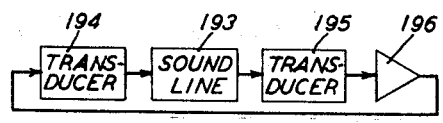
INVENTOR
J.B. SPELLER
BY
*F. J. Pisarra*
ATTORNEY July 30, 1968  J. B. SPELLER  3,395,270
RELATIVISTIC INERTIAL REFERENCE DEVICE
Filed June 28, 1962  8 Sheets-Sheet 2

INVENTOR
J.B. SPELLER
BY
F. J. Pizarra
ATTORNEY

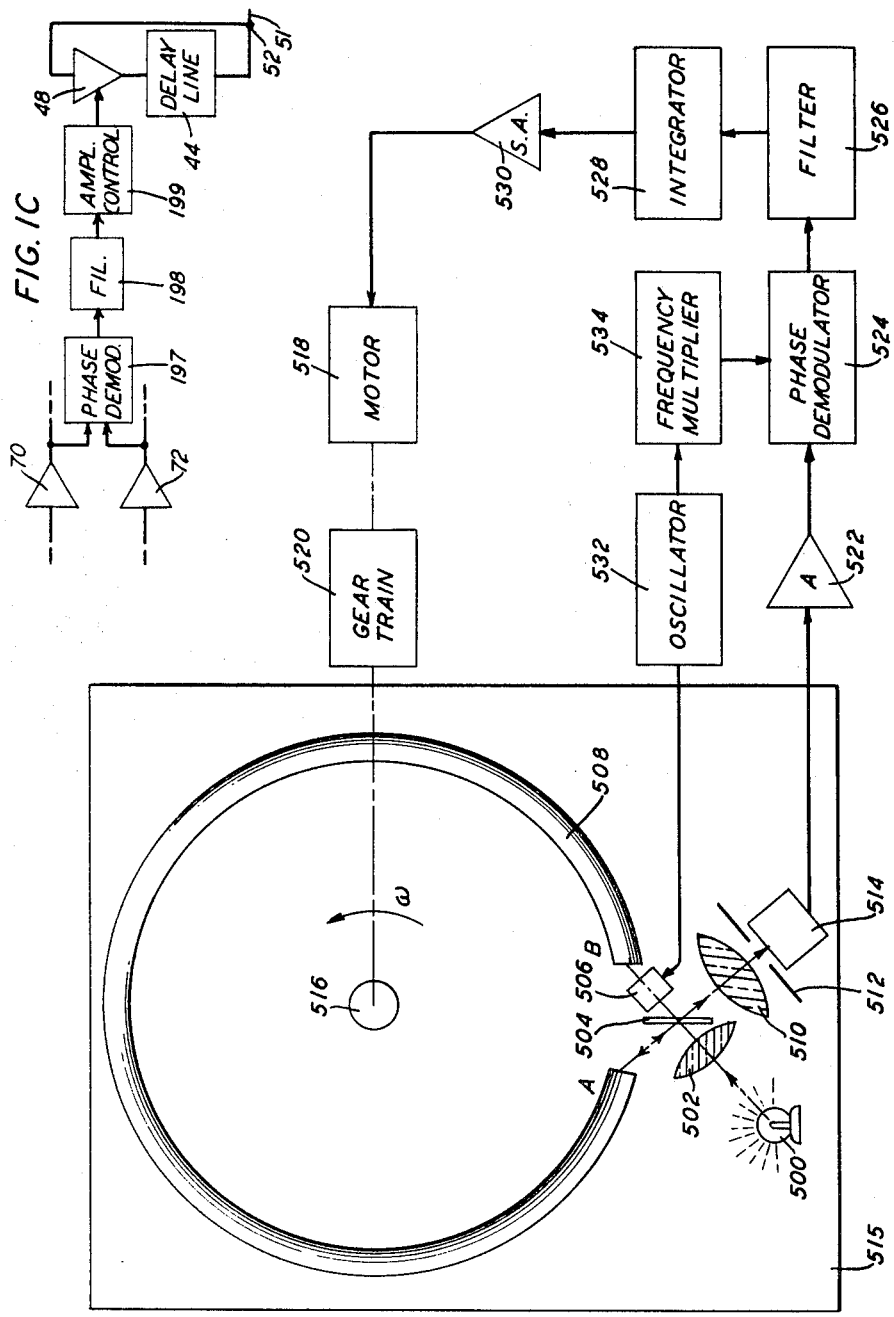

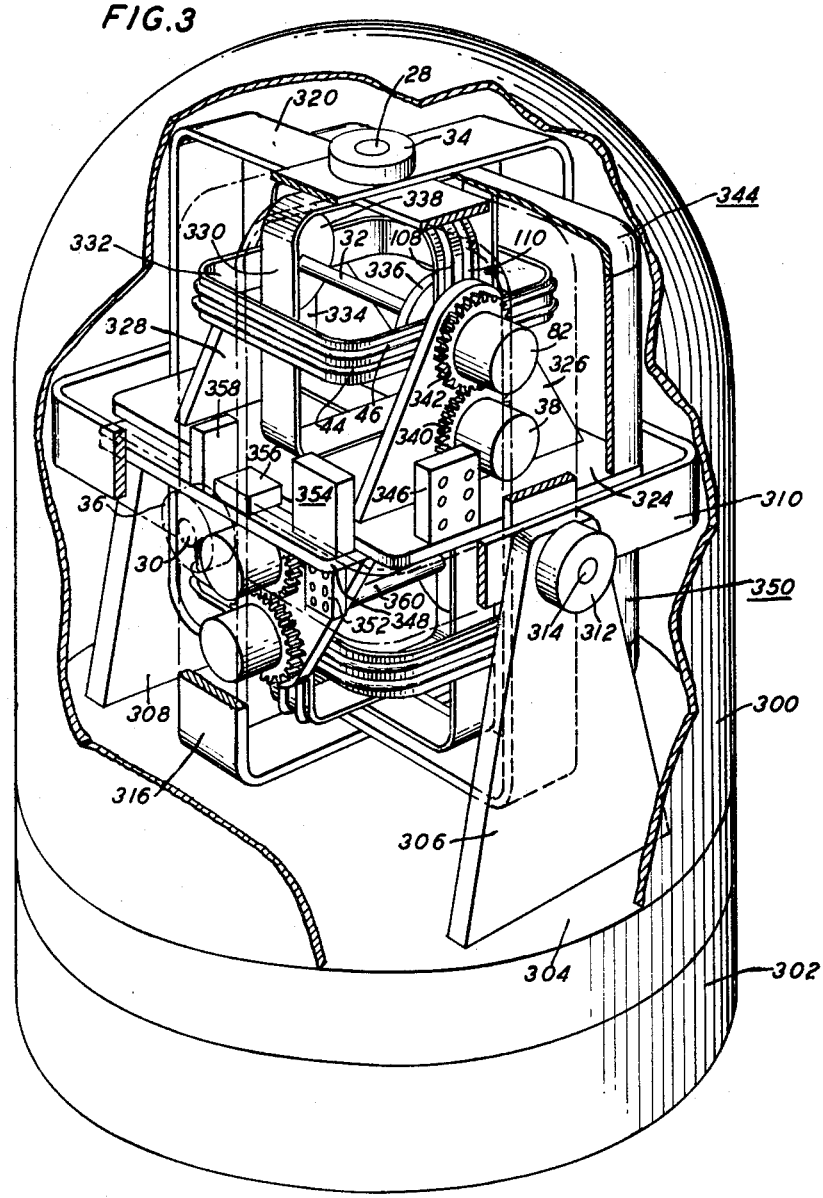

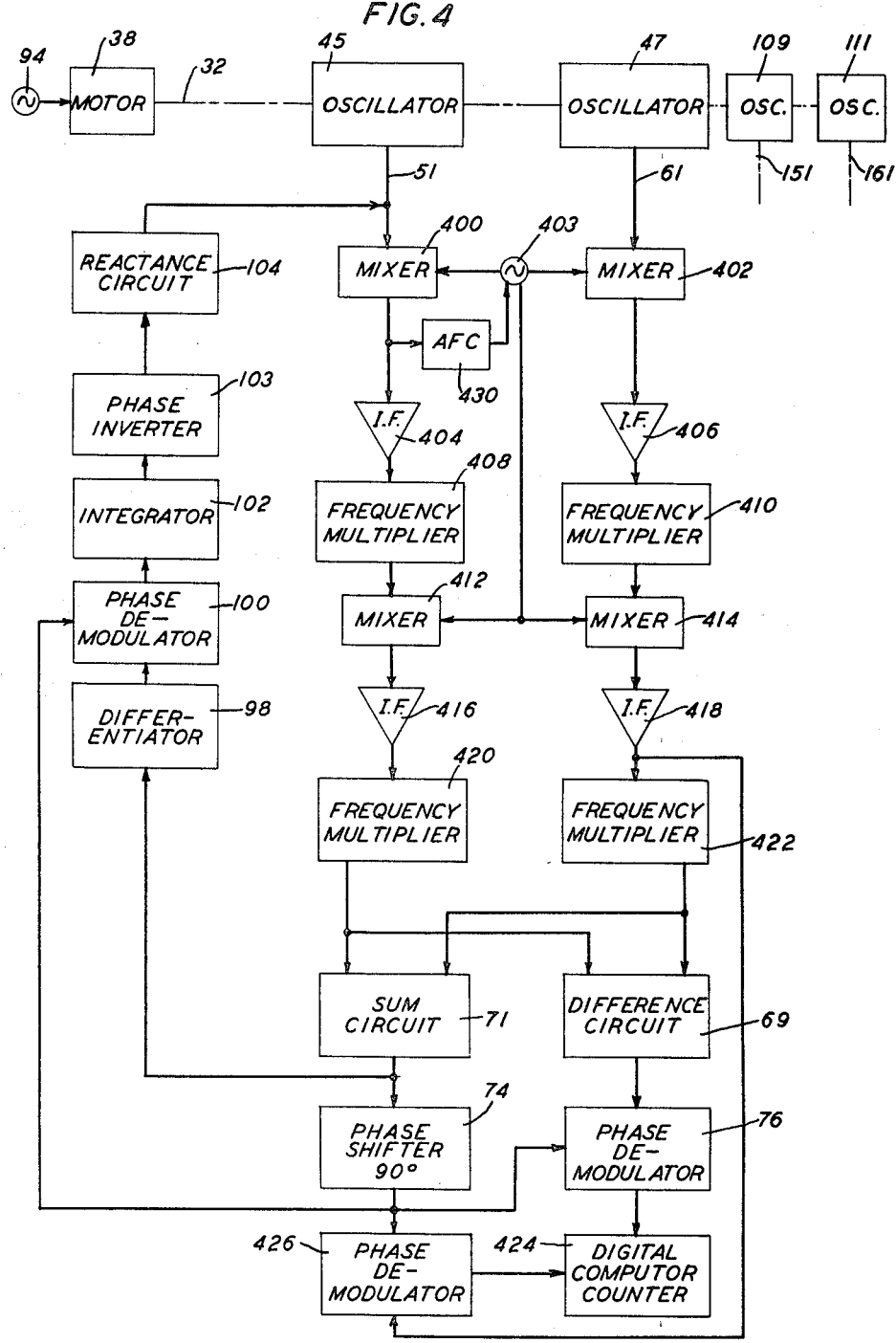

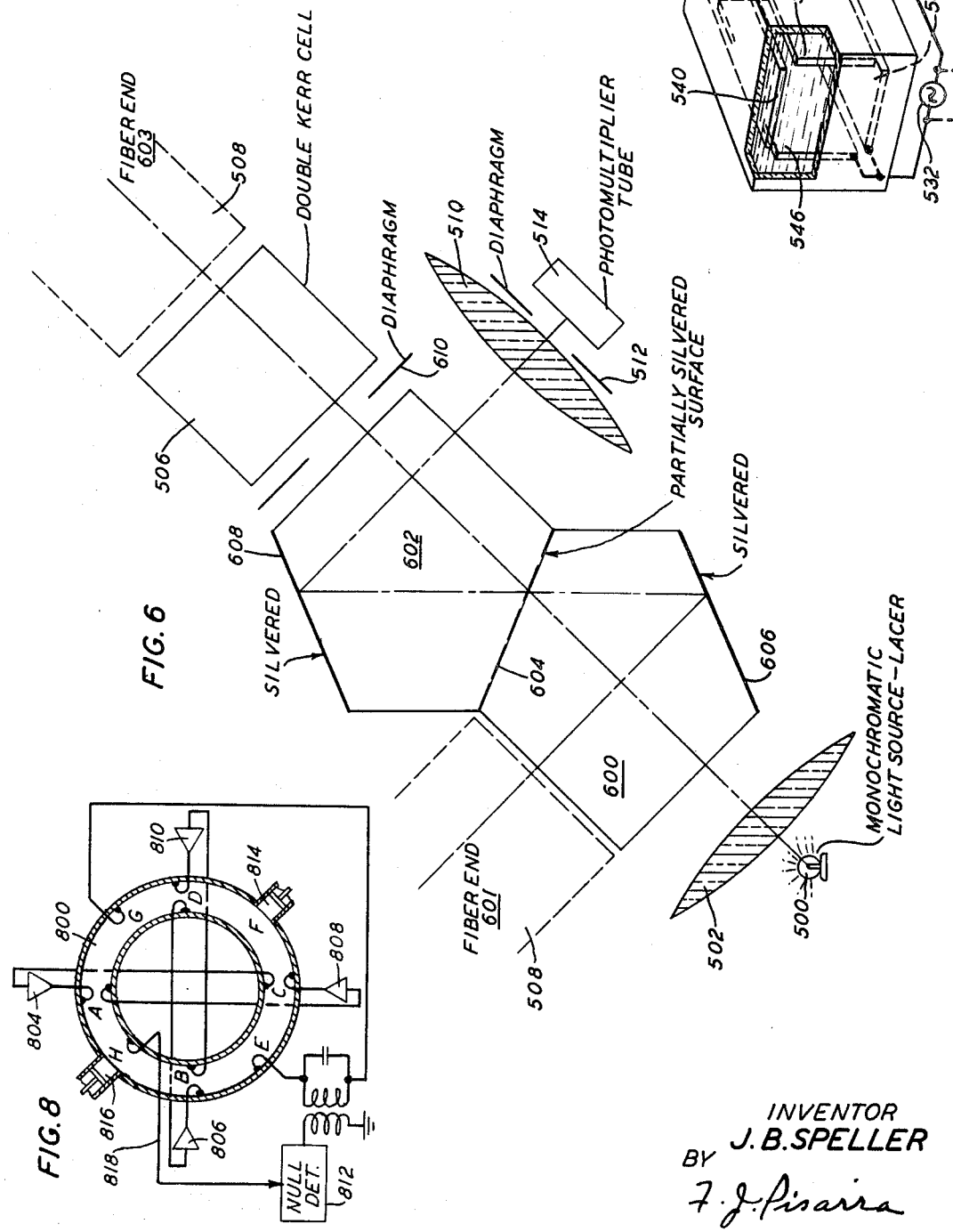

July 30, 1968    J. B. SPELLER    3,395,270
RELATIVISTIC INERTIAL REFERENCE DEVICE
Filed June 28, 1962    8 Sheets-Sheet 7
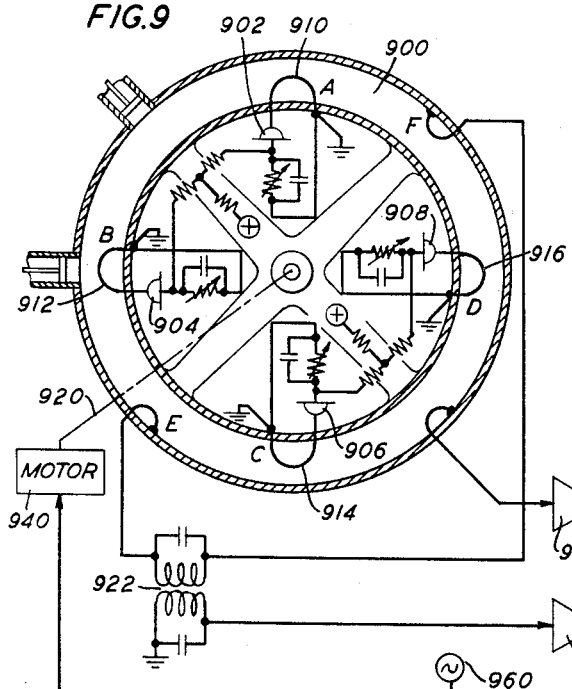
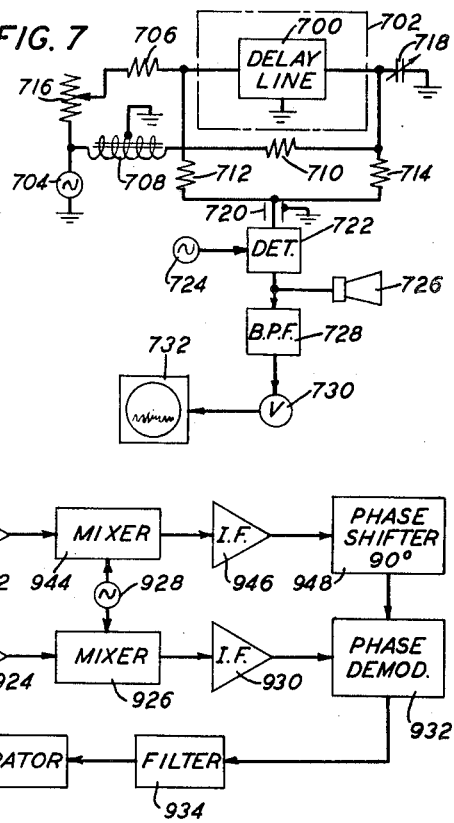
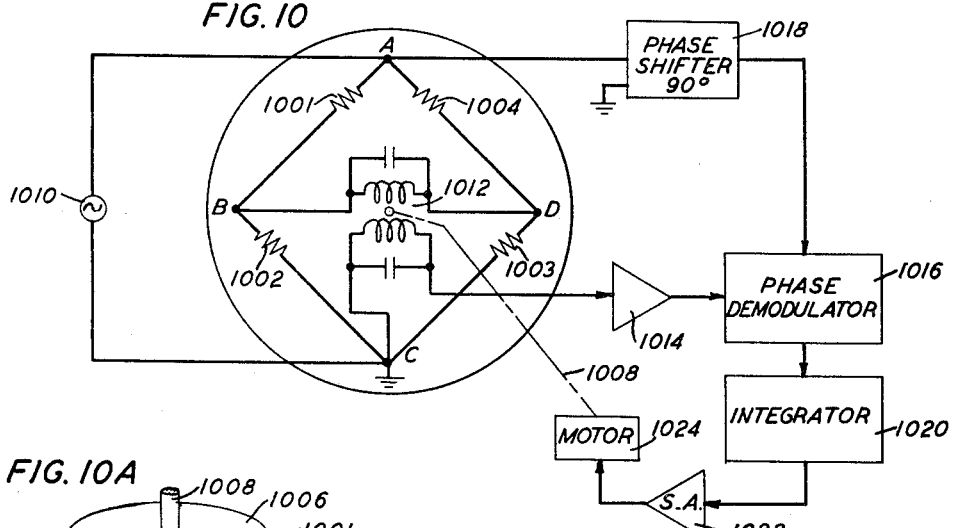
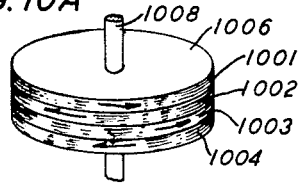
INVENTOR
J.B. SPELLER
BY
F.J. Pisarra
ATTORNEY July 30, 1968  J. B. SPELLER  3,395,270
RELATIVISTIC INERTIAL REFERENCE DEVICE
Filed June 28, 1962  8 Sheets-Sheet 8

INVENTOR
J. B. SPELLER
BY
F. J. Pisarra
ATTORNEY

United States Patent Office 3,395,270
Patented July 30, 1968

3,395,270
RELATIVISTIC INERTIAL REFERENCE DEVICE
Jack B. Speller, 415 Claremont Ave.,
Montclair, N.J. 07042
Filed June 28, 1962, Ser. No. 205,944
102 Claims. (Cl. 235—150.25)

This invention relates to devices responsive to angular motion or rotation and their uses in maintaining a stable inertial space platform and in the maneuvering of vehicles or for other purposes, and more particularly to an inertial reference device that utilizes a relativistic effect attributable to factors governed by the general relativity theory of Einstein.

In certain embodiments, the invention results in a device which may be placed in a gimbal mounting and used in the manner of a gyroscope, stabilized about a sensitive axis or about two or three mutually perpendicular sensitive axes, but requiring no massive rotating members. The device so mounted may provided a space platform stabilized with respect to the system of fixed stars and may be used either for visual aid in navigation or to supply information as by means of accelerometers mounted upon the space platform for actuating automatic piloting or navigating mechanisms, or for remote control of a vehicle, or like purposes. Alternatively, the device may be mounted directly upon the frame of a vehicle to supply information in response to rotation of the vehicle about one or more reference axes to actuate a computer or other device for automatic or remotely controlled navigation, or like purposes.

An object of the invention is to employ energy circulating in one or more transmission loops to detect angular motion in order to provide a precise inertial reference or for other purposes.

Another object is to maintain a precise inertial reference without the need of a massive rotor as used in a conventional gyroscope.

Another object is to reduce the drift rate of an inertial reference device, thereby increasing the accuracy thereof.

A further object is to prolong the useful life of such devices by eliminating the need for fast moving parts.

Another object is to provide waves circulating in opposite directions in a continuous transmission loop with a high degree of stability.

Another object is to utilize superconductivity, as under cryogenic conditions, to maintain circulating waves in a continuous transmission loop for the purpose of establishing an inertial reference.

Another object is to utilize low noise levels as induced by cryogenic conditions to improve an inertial reference device.

Another object is to employ a novel optical system in order to provide an inertial reference device.

Another object is to employ energy circulating in one or more transmission loops in a device for detecting angular motion without need for a low friction suspension of the device such as a system of gimbals, and to provide an output which may be either analog or digital in form.

Further objects are to reduce power consumption, increase reliability, reduce weight and size, and lower the cost of inertial reference devices.

Features of the invention include, in addition to elimination of fast moving parts and massive rotors, the elimination of heavy supporting members, and high speed bearings, and the reduction of starting time, as well as the reduction of variable effects due to large heat capacity where massive members are employed.

In place of a massive rotating member, one or more energized transmission paths are employed to detect angular motion.

Other features, objects and advantages will appear from the following more detailed description of illustrative embodiments of the invention, which will now be given in conjunction with the accompanying drawings.

In the drawings:

FIG. 1 is a schematic diagram of a two-axis angular motion responsive relativistic device suitable for operation at frequencies in the short wave regions less than the frequencies of visible light;

FIG. 1-A is a schematic diagram of apparatus that may be substituted for a portion of the apparatus shown in FIG. 1, by putting block 25 in place of either or both of blocks 21 and 23;

FIG. 1-B is a schematic diagram of an electrically excited sound wave or supersonic delay line which may be substituted for electromagnetic delay lines shown in FIG. 1;

FIG. 1-C is a schematic diagram showing an attachment which may be added to the apparatus shown in FIG. 1;

FIG. 3 is a perspective pictorial representation, partly cut away, showing an arrangement for mounting an embodiment of the invention in supporting gimbals;

FIG. 4 is a schematic diagram of a two-axis angular motion responsive relativistic device arranged to supply signals to actuate a digital computer;

FIG. 5 is a schematic diagram of a single-axis angular motion responsive relativistic device for operation with a light beam;

FIG. 5-A is a schematic diagram of a double Kerr cell with connected electrical modulator;

FIG. 6 is a schematic diagram of an arrangement of optical prisms partially transmitting and partially reflecting, to accommodate a broad beam of parallel rays;

FIG. 7 is a schematic diagram of a nulling and phase shifting arrangement for electromagnetic waves, using a single line in two opposite directions;

FIG. 8 is a schematic diagram of a single loop device for setting up standing waves for use in detecting rotation;

FIG. 9 is a schematic diagram of another form of standing wave device for rotation detection;

FIG. 10 is a schematic diagram of a device employing resistance lines or resistors in place of reactive lines for detecting rotation;

FIG. 10-A is a perspective representation of a winding spool for resistance lines in a device according to FIG. 10.

Figure 11:
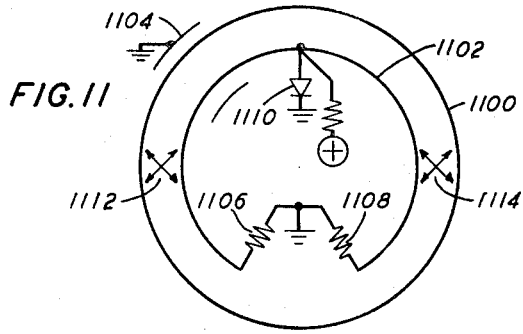
Figure 12:
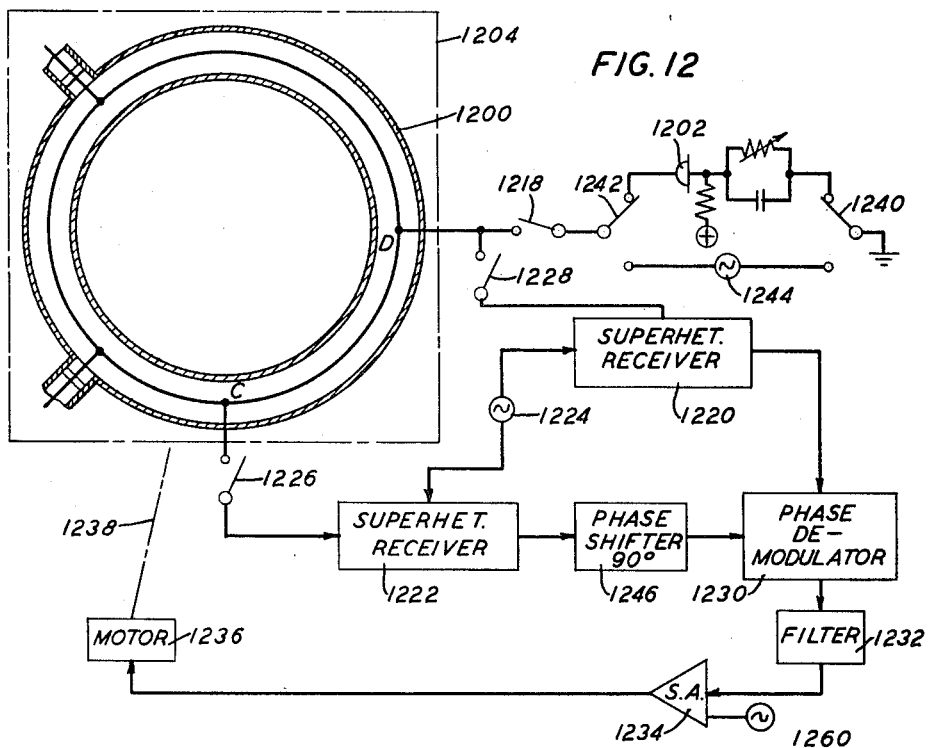
Figure 13:
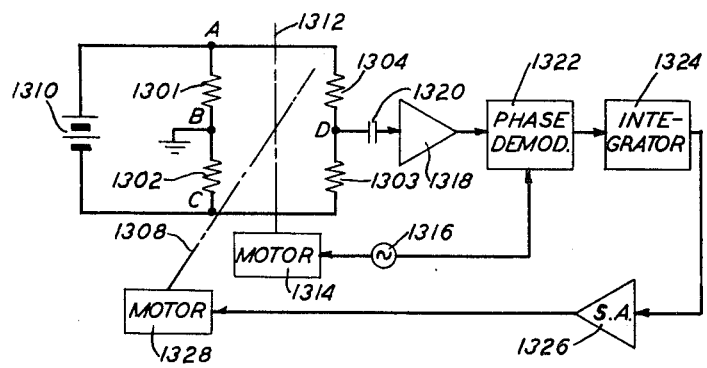

FIG. 11 is a schematic diagram of a rotation detecting arrangement employing two transmission lines coupled together through directional couplers;

FIG. 12 is a schematic diagram of a rotation detecting system suitable for utilizing superconductivity in a transmission line under cryogenic conditions; and FIG. 13 is a schematic diagram of a resistive network device for rotation detection which may be used with direct current in the sensitive elements.

Figure 2:
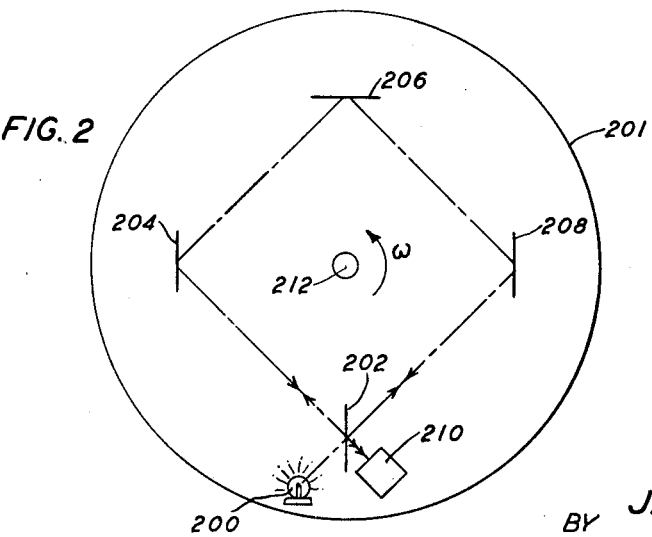
FIG. 2 is a diagram useful in explaining an early experiment af Sagnac demonstrating a physical principle used in the invention.

My invention utilizes the principles of the general relativity theory of Albert Einstein in order to detect angular motion by means of energy circulating in a loop path subjected to angular motion having a component in the plane of the loop. Experiments have been performed by G. Sagnac and A. A. Michelson that have verified the existence of a measurable effect caused by angular motion of a circuit upon the transmission of electromagnetic waves in the circuit. It will be useful in explaining the present invention to describe briefly Sagnac's experiment as set forth in a book entitled "Light" by R. W. Ditchburn, published by Interscience Publishers, Inc., 1957, pp. 337 and 338. FIG. 2 shows the arrangement used in Sagnac's experiment. On a rotatable platform 201 there was mounted a light source 200. A beam of light from the source 200 was split by means of a partially silvered mirror 202 into two beams diverging at right angles to each other. Mirrors 204, 206 and 208 were arranged so as to define a square path for light beams as shown. The beam reflected by the partially silvered mirror 202 traversed the path in the clockwise direction, while at the same time the beam transmitted through the partially silvered mirror 202 traversed the same path in the counterclockwise direction. A camera 210 was placed to receive light from both beams after transmission around the square path. The platform and the entire apparatus could be rotated about a central shaft 212. Interference fringes were recorded upon a photographic plate and it was found that the fringes were shifted in position when the platform was rotated as compared with their position when the platform was at rest.

An approximate analysis of the phenomenon involved, sufficiently accurate for practical use, may be made on a purely non-relativistic basis as follows: Let C be the velocity of light and V the linear velocity at the mirrors. Suppose for simplicity a circular path instead of a square one, and let S be the path length. Then $C+V$ is the apparent velocity of the waves with respect to the platform for the beam which is traveling in the direction opposite to the rotation of the platform and $C-V$ is the apparent velocity of the waves with respect to the platform for the beam traveling in the same direction as the rotation of the platform. The difference in time for the waves in the two beams to travel once around the path in the presence of the rotation is $$\Delta t = \frac{S}{C-V} - \frac{S}{C+V}$$

When V is small compared to C, the time difference reduces to $$\Delta t = \frac{2VS}{C^2}$$

and the corresponding difference in effective path length is $$\Delta S = \frac{2VS}{C}$$

Expressed in wavelengths of the traveling waves, the difference in path length is $$\Delta n = \frac{2VSf}{C^2}$$

and expressed in radians it is $$\Delta \theta = \frac{4\pi VSf}{C^2}$$

where $f$ is the frequency in cycles per second.

Letting $a$ represent the velocity ratio $V/C$, and substituting $\omega_1$ for $2\pi f$, the phase shift may be expressed as $$\Delta \theta = \frac{2a\omega_1 S}{C}$$

The ratio $S/C$ is the nominal time required by a light beam to traverse the length S of the path, which time may be represented by T, whereupon the phase shift becomes $$\Delta \theta = 2a\omega_1 T \text{ radians}$$

A theoretical discussion of the phenomenon involved is contained in an article by P. Langevin entitled "Sur la theorie de relativite et I' esperience de M. Sagnac," published in Comptes Rendus, v. 173, pp. 831-4, November 1921.

Langevin follows Einstein's general theory of relativity in deriving an expression for the difference in traverse time for a ray of light to traverse the same circuit in two opposite senses, in the direction of the rotation and in the direction opposing the rotation. The coordinates as measured on the rotating platform are $x$, $y$, $z$ and $t$, while the coordinates as measured on the ground, that is, in a system which is not rotated, are $x'$, $y'$, $z'$ and $t'$. The two sets of coordinates are related in the following manner:

$x' = x \cos \omega t - y \sin \omega t$
$y' = x \sin \omega t + y \cos \omega t$
$z' = z$
$t' = t$.

To an observer on the ground, the usual Euclidean relationship holds, $$ds^2 = C^2 dt'^2 - dx'^2 - dy'^2 - dz'^2$$

This expression is invariant to the above transformation of coordinates. Upon substitution, the relationship as seen by the observer on the platform takes the form $$ds^2 = C^2 dt^2 - 2\omega(xdy - ydx)dt - dL^2$$

where $$dL^2 = dx^2 + dy^2 + dz^2$$

The propagation of a beam of light is governed by the relation $$ds^2 = 0$$

that is, $$C^2 dt^2 - 4\omega dA dt - dL^2 = 0$$

where $(xdy - ydx)$ represents twice the area of an elemental triangle with apex at the origin of coordinates and with base the projection on the $xy$ plane of an element of a ray of light as viewed by an observer on the platform. This is a quadratic equation in $dt$ and has the approximate solution $$dt = \frac{dL}{C} + \frac{2\omega}{C^2} dA$$

The traverse time is found by integrating $dt$ over a closed path with the following result $$t_1 = \frac{L}{C} + \frac{2\omega A}{C^2}$$

where A represents the area projected on a plane normal to the axis of rotation by a surface bounded by the closed path. It is evident that the result depends upon the sign of the rotation. When this sign is reversed, the traverse time becomes $$t_2 = \frac{L}{C} - \frac{2\omega A}{C^2}$$

The difference between these two times is $$4\omega A/C^2$$

In the case of a circular path of length S and a peripheral speed of V, as in Sagnac's experiment, the difference in time is $$2VS/C^2$$

as found above in the non-relativistic derivation.

Having thus found the time difference for light rays, this difference may be converted into a difference in wave lengths for light rays, or a difference in phase in radians, and so forth. Then, according to Einstein's Principle of Equivalence, a transmission loop of a given configuration may be operated with sound waves or supersonic waves or other waves of any desired type. The difference in traverse time determines a corresponding difference in apparent path length, which differential length may be conceived as being occupied by waves of any nature, not necessarily light waves or other electromagnetic waves traveling at the speed C, but light waves traveling at a lesser speed in a refractive medium, electromagnetic waves of any type traveling at whatever speed is dictated by the type of transmission line or structure in which they travel, or sound waves traveling at a speed similarly dictated by the structure in which they travel. Although many of the embodiments shown herein relate to electromagnetic waves, either in the light range or otherwise, it will be understood that sound waves, supersonic waves, or other types of waves may also be employed with like effect. Furthermore, Einstein's Principle of Equivalence applies to cases such as the direct current resistance bridge embodiment described herein in which a relativistic change of length of a resistance winding is utilized to detect rotation.

The results obtained by Sagnac on a light path of reasonable length such as might be incorporated in a vehicle were very small in magnitude as evidenced by the fact that the results were measured by means of interference patterns, registered upon a photographic plate. In addition, they were obtained with rather large rates of rotation. Michelson on the other hand, used a path length in the neighborhood of a mile long in order to measure the rate of rotation of the earth about its axis. In either case, it is evident that additional factors need to be brought into play in order to use the relativistic effect for control of a space platform of reasonable size and for use in an ordinary vehicle.

An idea of the magnitude of the response involved may be obtained by substituting representative values in the equations for path length difference. It will be assumed that it is desired to be able to detect a drift rate as small as $10^{-5}$ degrees per hour in order to improve upon the performance of known highly precise floated gyroscopes. If a transmission line, such as a coaxial cable, is coiled in a circle of circumference one foot, the linear velocity of a point in the coil when the coil is rotated $10^{-5}$ degrees per hour is 7.7 times $10^{-12}$ feet per second. Assuming that 100 feet of cable are used, the values to be substituted in the formula, in terms of feet and seconds are:

$V = 7.7$ times $10^{-12}$, or approximately $10^{-11}$
$S = 100$
$C = 10^9$ from which it is found that the path length difference is $1.54 \times 10^{-18}$ feet. Assuming that the waves employed are electromagnetic waves traveling in the rotatable structure at the sped C and having the frequency of one kilomegacycle per second, the wavelength is approximately one foot. The distance of $1.54 \times 10^{-18}$ feet constitutes $1.54 \times 10^{-18}$ wavelengths for such waves, which means a phase difference of $9.68 \times 10^{-18}$ radians. This is evidently a very small phase difference and for that reason special provisions such as described herein are required in order to utilize the effect for the desired purposes.

If, for example, supersonic waves of a frequency of 10 megacycles per second are used instead of electromagnetic waves, the speed of propagation of the waves in the rotatable structure is about $10^3$ feet per second, giving a wavelength of about $10^{-4}$ feet. In this case, the distance of $1.54 \times 10^{-18}$ feet previously found, which does not depend upon the type of wave employed, constitutes $1.54 \times 10^{-14}$ wavelengths, which means a phase difference of $9.68 \times 10^{-14}$ radians.

While comparison of the above results for electromagnetic waves and supersonic waves respectively favors the supersonic waves, other considerations may influence the choice of the type of wave to be used in any particular case.

In applications of the invention where a single wave source is employed as by Sagnac to send waves in opposite directions over what is essentially a single path, as is usual in optical systems, the difference in effective path length results in a phase difference between the waves at the end of the path. The amount of this phase difference is a function of the time rate of rotation of the path and is a constant phase difference at any given rate of rotation. The phase difference may be detected optically by observing the pattern of interference fringes produced, or electrically by means of a photomultiplier.

The same principles may be applied to a system in which two distinct paths of substantially equal length are employed and substantially independent oscillations are maintained in the two paths. The difference in effective path length then results in a frequency difference between the waves in the two paths. In this case, it is the amount of the frequency difference that is a function of the time rate of rotation of the path, and the phase difference is a function of time, going through a sinusoidal time variation at a rate corresponding to the best frequency produced by the combination of the waves in the two paths. There is a proportionality of time rates here, the rate of variation of the phase difference being proportional to the rate of angular displacement of the paths. Alternatively, waves traveling in opposite directions in a single transmission path may be used.

In the case of self-oscillating circuits the phase difference is found to be $$\Delta\theta = 2a\omega_1 \Delta t \text{ radians}$$

which is directly comparable with the expressions for the phase difference in a circuit subjected to forced oscillations.

The non-relativistic analysis used in connection with the Sagnac experiment may be extended to the case of two circuits individually energized. The time required for light to travel once around the transmission loop in the direction opposite to the rotation is $$\Delta t_1 = \frac{S}{C - V}$$

The time per complete cycle of oscillation is twice this, and the corresponding value of the frequency is $$f_1 = \frac{C - V}{2S}$$

Similarly, the frequency of the oscillation traveling in the same direction as the rotation is $$f_2 = \frac{C + V}{2S}$$

and the frequency difference is $$\Delta f = \frac{V}{S}$$

Integrating the frequency difference over a period $\Delta t$ gives the accumulated phase difference between the two oscillating circuits as $$\Delta\theta = \frac{V \Delta t}{S}$$

which is readily reducible to $$\Delta\theta = 2a\omega_1 \Delta t \text{ radians}$$

where $\omega_1$ as before is the frequency in the absence of rotation. The individual circuits subject to relativistic effects due to rotation will sometimes be referred to herein as relativistic oscillators.

The use of self-oscillating loop circuits provides an increase in sensitivity as compared with a system of the type like the optical system in which a single source of waves is used. In effect, the self-oscillating loop circulates a wave repeatedly around the loop so that at each round trip the phase difference between waves in the two loops increases, giving the equivalent of extending indefinitely the length of each line.

In the example given wherein 100 feet of cable are coiled in a circumference of one foot and the linear velocity at the circumference of the coil is $7.7 \times 10^{-12}$ feet per second for a rotation of the coil at the rate of $10^{-5}$ degrees per hour, $a$ is $7.7 \times 10^{-21}$, $\omega_1$ is $2\pi \times 10^9$ and $$\Delta\theta = 9.68 \times 10^{-11} \Delta t \text{ radians}$$

At this rate, at the end of one second, the phase difference has grown from zero to $$9.68 \times 10^{-11} \text{ radians}$$

It will be evident that after a sufficient time lapse, the phase difference will have risen to any desired value and may then be sufficient to operate a sensitive phase detector. This works to effectively multiply the phase difference, and if the time required to obtain the desired phase difference is not excessive there will be no significant delay in the response of the system to a change in angular rate of rotation. In addition it will be noted that large changes in rate of rotation will result in shorter response times.

Figure 1A:
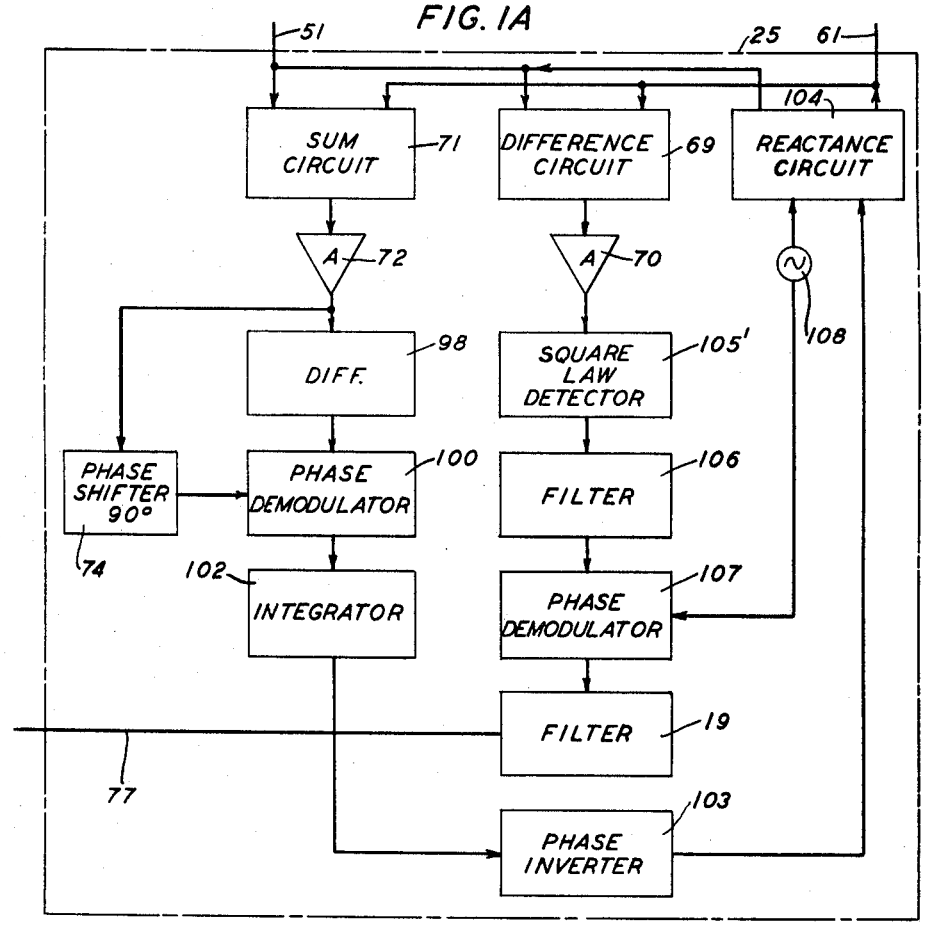

FIG. 1 shows arrangements for combining waves from two self-oscillating loop circuits 44, 48, and 46, 50 to obtain a nulling effect in a difference circuit 69. A difference wave from the output of the difference circuit 69 is amplified in an amplifier 70 and is phase demodulated in a phase demodulator 76.

The outputs of the two oscillators may be represented as follows:

$$E_1 = A \sin(\omega t + \Delta\theta)$$
$$E_2 = A \sin(\omega t - \Delta\theta)$$

where $A$ is the amplitude of the voltage of either oscillator, $\omega$ is the oscillator frequency in radians per second, and $\Delta\theta$ is the phase change due to the rotational motion. The phase is $+\Delta\theta$ in one case and $-\Delta\theta$ in the other since the lines are wound in opposite directions.

The outputs of the two oscillators are opposed in the difference circuit to give $$E_1 - E_2 = A[\sin(\omega t + \Delta\theta) - \sin(\omega t - \Delta\theta)]$$
$$= 2A \sin \Delta\theta \cos \omega t.$$

This voltage is used for the signal input to the phase demodulator 76. The reference carrier voltage for the phase demodulator is obtained by first summing the two oscillator outputs in the sum circuit 71 to obtain $$E_1 + E_2 = A[\sin(\omega t + \Delta\theta) + \sin(\omega t - \Delta\theta)]$$
$$= 2A \sin \omega t \cos \Delta\theta$$

Since $\Delta\theta$ is very small, and a small phase in the reference carrier wave causes negligible error, $\cos \Delta\theta$ can be replaced by unity, giving $$E_1 + E_2 = 2A \sin \omega t$$

which when shifted by 90 degrees in the phase shifter 74 becomes the reference voltage $$2A \cos \omega t$$

The output of the phase demolulator 76 is $$E_o = 2A \cos \omega t \times 2A \cos \omega t \sin \Delta\theta$$
$$= 2A^2 \sin \Delta\theta + 2A^2 \cos 2\omega t \sin \Delta\theta$$

which easily reduces to $$E_o = 2A^2 \sin \Delta\theta$$

when filtered.

It will now be shown that the process of nulling two waves in a difference circuit further effectively multiplies the phase difference present in two waves impressed thereon. Let $k$ indicate the degree of nulling obtained in the difference circuit. Then $$k = 1$$

indicates complete nulling. If $E$ is the amplitude of the difference wave, then for any degree of nulling, $$E = A \sin(\omega_1 t + \Delta\theta) - kA \sin(\omega_1 t - \Delta\theta)$$

which is readily reducible to $$E = A(k+1)\Delta\theta \cos \omega_1 t + A(1-k) \sin \omega_1 t$$

For complete nulling, $$E = 2A\Delta\theta \cos \omega_1 t$$

in which case, $E$ is proportional in amplitude to $\Delta\theta$ but the phase of $E$ is independent of $\Delta\theta$ and so is not sensitive to a change in $\Delta\theta$. On the other hand, if there were no nulling we would have $$E = A \sin(\omega_1 t + \Delta\theta)$$

in which case although the phase of $E$ varies with $\Delta\theta$, the value of $\Delta\theta$ is extremely small and hard to detect. The multiplication effect for phase difference occurs in a portion of the range of partial nulling. To study this range it is convenient to let $$K = 1 - k$$

then $$k + 1 = 2 - K$$

and $$E = A(2-K)\Delta\theta \cos \omega_1 t + AK \sin \omega_1 t$$

When $K$ and $\Delta\theta$ are comparable numbers, as for example when $\Delta\theta = 9.68 \times 10^{-11}$ radians, and
$K = 10^{-10}$
$E = 2A\Delta\theta \cos \omega_1 t + A \times 10^{-10} \sin \omega_1 t$
$= A \times 1.93 \times 10^{-10} \cos \omega_1 t + A \times 10^{-10} \sin \omega_1 t$
$= A \times 10^{-10}(1.93 \cos \omega_1 t + \sin \omega_1 t)$ which is readily reducible to $$E = 2.17 \sin(\omega_1 t + 62.6°) \times A \times 10^{-10}$$

The phase angle of $E$ is now seen to be 62.6°, or 1.09 radians, compared with the value $9.68 \times 10^{-11}$ radians for $\Delta\theta$, which amounts to a multiplication of $1.1 \times 10^{10}$ in the phase difference.

A phase shift of this amplitude is readily detectable in a conventional phase demodulator. It is evident that with a nulling technique as described herein, very minute phase differences can be detected.

It will be evident that in the oscillating circuits there will be many factors which will result in phase shifts or frequency changes all of which may result in variable phase differences between the waves in the respective relativistic oscillators, in addition to and superimposed upon the phase difference attributable to the relativistic effect of rotation of the coils about their sensitive axis. In order to utilize the desired relativistic effect it is only necessary that the phase difference due to this effect be somewhat greater, preferably several times greater, than the sum of the phase differences due to the undesired effects. The difference wave obtained in the difference circuit will then contain a phase modulation component which is attributable to the relativistic effect and which is distinguishable in magnitude from the phase modulations due to the undesired effects. As has been shown above, the phase difference in the output of the difference circuit is multiplied by a large factor, in the example given, by a factor of $10^{10}$, compared to the phase difference in the waves impressed upon the input of the difference circuit. The output wave however must be phase demodulated in order to obtain a signal which will represent the amount of the phase difference. The phase demodulator will in general have a threshold of sensitivity which may be much higher than the amplitude of the difference wave at the output of the difference circuit. In accordance with known practice, the difference wave may be amplified up to the level required to actuate the phase detector in the usual manner. Thus, in summary, the difference circuit functions to heighten the degree of phase modulation in the signal wave, and amplifiers are employed to raise the energy level of the signal wave up to the threshold level of the phase demodulator.

FIG. 1 shows schematically the apparatus used in controlling rotation about two mutually perpendicular sensitive axes and Y. FIG. 3 shows the control apparatus mounted in a three-gimbal support system of the type commonly used in mounting gyroscopes or in providing an inertially stable space platform. In practice, the space platform may be stabilized in any desired attitude in space. For convenience the space platform is illustrated in FIG. 3 as being horizontal.

The X axis is defined by a shaft 28. When the vehicle containing the apparatus is levelled and the space platform is horizontal this axis is vertical as shown in FIG. 3. The Y axis is defined by a shaft 30 which in all attitudes of the platform is perpendicular to the X axis and is horizontal in an athwart-ship direction, in the attitude of the space platform, as shown in FIG. 3.

Motors 34 and 36 are provided for driving the shafts 28 and 30 respectively. A gear train 40 may be interposed between the shaft 28 and the rotor of the motor 34 as well as a gear train 42 between the shaft 30 and the rotor of the motor 36.

An advantage may be gained by rotating the sensing coils about their common diameter, preferably at a moderate rate, such as one revolution per second, although other rates may be used. The purpose of providing this rotation is to enable a distinction to be made between phase changes arising in the sensing coils due to the rotation about a sensitive axis and spurious signals which may be generated in the various components of the system due to drifting of the impedance values of the components under temperature variations, aging, or other causes. The rotation of the sensing coils about their common diameter introduces a modulation into the waves generated in these coils which modulation does not occur in the spurious signals, thereby enabling the wanted signals to be separated from the unwanted signals on a frequency discrimmination basis.

For various reasons it is sometimes desirable to use more than one pair of sensing coils. For example, if a single pair of sensing coils is used to sense rotation about the vertical, the rotation of these coils about their common diameter will bring the sensing coils into a vertical plane, in which position they receive no component of rotation about the vertical axis and so are unable to sense the rotation about that axis. To remedy this condition, a second pair of sensing coils is placed at right angles to the first pair with a common diameter of the two pairs perpendicular to the X axis.

An explanation will now be given of the way a pair of coils lying in parallel planes and rotated about an axis parallel to these planes may be used to detect rotation of the coils about a sensitive axis. Start at time $t=0$ with the coils in a vertical plane, in which position the coils are insensitive to the relativistic effect of rotation about a vertical sensitive axis. Let $\omega_2$ be the rate of rotation of the coils about a horizontal axis, in radians per second. Then the projection of the area of either of the coils upon the horizontal plane is related to the area of the coil by the factor $$\sin \omega_2 t$$

which factor also expresses the phase of the $\omega_2$ rotation. It will be assumed that at the time $t=0$ the two coils have the same frequency, $\omega_1$ radians per second and the same phase defined by $$\sin \omega_1 t$$

Now let the coils be rotated at the $\omega_2$ rate into position to detect the relativistic rotation. During the first half-cycle of the $\omega_2$ rotation a frequency difference $\Delta\omega$ will develop between the waves in the two coils, which difference is determined by $$\Delta\omega = \Delta \frac{d\phi}{dt} = 2a\omega_1 \sin \omega_2 t$$

where $\phi$ is a phase angle, $d\phi/dt$ is the time rate of change of this phase angle, and $\Delta(d\phi/dt)$ is the difference in time rate of the phase change. The change in the latter time rate is due to the modulating effect of the rotation about the horizontal axis.

It will be noted that during a half cycle of the rotation about the horizontal axis the $\omega$-difference in one of the coils first increases and then decreases, coming back to zero again at the end of the half-cycle. At the same time the $\omega$-difference in the other coil first decreases and then increases. The frequencies in the two coils thus depart from equality during this period and then come back into frequency equality at the end of the period. At the end, however, the two coils are no longer oscillating in phase with each other.

The phase difference change during the half-cycle is determined by the integral of the frequency change, as follows:

$$\Delta\phi = \int_{\omega_2 t=0}^{\omega_2 t=\pi} \Delta\omega\, dt = \int_{\omega_2 t=0}^{\omega_2 t=\pi} 2a\omega_1 \sin \omega_2 t\, dt$$

$$= \frac{4a\omega_1}{\omega_2} \text{ radians}$$

Thus, at the end of the first half-cycle, the coils are at the same original equal frequency but are oscillating with a phase difference between them of $-4a\omega_1/\omega_2$ radians.

During the second half-cycle, the coils are in turned over position, so that the coil with the higher frequency oscillations during the first half-cycle now has oscillations at the lower frequency, and vice versa. The frequency difference detected is of the same magnitude as before but is opposite in sense, as indicated by the reversed loop of the sine function. The frequency difference goes through the same set of changes as during the first half-cycle but now it first increases negatively and then decreases negatively back to zero at the end of the period. In other words the coils are again moved apart in frequency and brought back finally at the end to the same original equal frequency. The phase change, however, is the reverse of what is was during the first half-cycle, bringing the coils back into phase synchronism at the end of the complete cycle.

During the first half-cycle above described, the frequency of one coil is undergoing a change from $\omega_1$ to $(1+a)\omega_1$ and back to $\omega_1$, while the frequency of the other coil goes from $\omega_1$ to $(1-a)\omega_1$ and back to $\omega_1$. The wave in the first mentioned coil may be expressed as $$A \sin (1+a \sin \omega_2 t)\omega_1 t$$

and the wave in the second coil by $$A \sin (1-a \sin \omega_2 t)\omega_1 t$$

These waves may be impressed upon a difference circuit to obtain a difference wave of the form $$A[\sin (1+a \sin \omega_2 t)\omega_1 t - \sin (1-a \sin \omega_2 t)\omega_1 t]$$
$$= 2A \sin (a\omega_1 t \sin \omega_2 t) \cos \omega_1 t$$

The difference wave after being amplified up to an energy level sufficient to operate an available phase demodulator may be phase demodulated with respect to a reference wave $2A \cos \omega_1 t$ to obtain $$2A^2 \sin (a\omega_1 t \sin \omega_2 t)$$

For very small values of the angle $a\omega_1 t \sin \omega_2 t$, and over a brief period $\Delta t$ the result reduces approximately to $$2A^2 a\omega_1 \Delta t \sin \omega_2 t$$

This wave may now be phase demodulated with respect to a reference wave $2A \sin \omega_2 t$ to give $$2A^3 a\omega_1 \Delta t \text{ volts}$$

During the second half cycle, the frequency of the first coil changes from $\omega_1$ to $(1-a)\omega_1$ and back to $\omega_1$, while the frequency of the second coil goes from $\omega_1$ to $(1+a)\omega_1$ and back to $\omega_1$.

The results in each succeeding half-cycle may be added together in an integrator to accumulate a voltage increasing with time at the rate of $$2A^3 a\omega_1 \text{ volts per second}$$

for as long a time as may be desired in order finally to obtain a signal strong enough to be used for control purposes.

Assuming that A is 2 volts, and using the value of $a$ as $7.7 \times 10^{-21}$ corresponding to the drift rate of $10^{-5}$ degrees per hour, and the value of $\omega_1$ as $10^9$, the voltage rises at the rate of $1.23 \times 10^{-10}$ volts per second.

In view of the small assumed drift rate of $10^{-5}$ degrees per hour, the signals might if necessary be integrated over the entire period of an hour and the result used at that time to effect the necessary correction. At the calculated rate, as applied to the example used above, the integrated voltage at the end of one hour is $2.8 \times 10^{-6}$ volts. However, by using large amplifications, control signals of workable amplitude may be obtained during much shorter integrating periods, as short as a few seconds, for example.

The level of undesired effects may be calculated approximately on the assumption that such effects are due entirely to thermal noise. Using the standard formula for thermal noise, $$E = \sqrt{4KTR\Delta f}$$

where E is the voltage due to noise, K is the Boltzmann's constant, $1.37 \times 10^{-23}$ joules per degree Kelvin, T is the temperature in degrees Kelvin, R is the effective resistance of the circuit, having a value of about 2 ohms when the circuit employs a tunnel diode and $\Delta f$ is the bandwidth required by the variation due to the rotation of the lines about the shaft 32. If it assumed that T is 300 degrees Kelvin, and the bandwidth is one cycle per second, then the noise voltage is calculated to be approximately $$1.8 \times 10^{-10} \text{ volts}$$

At the calculated rate of signal voltage rise of $1.23 \times 10^{-10}$ volts per second, it is evident that in a few seconds the signal will rise well above the calculated noise level.

Four relativistic oscillators are shown in FIGS. 1 and 3, each comprising a coiled delay line and an amplifier. One pair of oscillating circuits comprising lines 44 and 46 lying in parallel planes. A second pair comprises lines 108 and 110 lying in parallel planes perpendicular to the planes of the coils 44 and 46. The delay lines or sensing coils as they will sometimes be called may be coaxial cables, waveguides, strip transmission lines, or other known structures. The coiled lines are mounted with their diameters aligned with a shaft 32 which is mounted in bearings that are rigidly attached to the space platform. The direction of the shaft 32 is perpendicular to the shaft 28 and these shafts maintain this perpendicular relationship throughout all motions of the gimbals. A motor 38 is provided for driving the shaft 32. Power for motor 38 may be supplied from any suitable source, shown here as an oscillator 94, which may, for example, generate current at 400 cycles per second, according to common practice.

An amplifier 48 such as a tunnel diode is connected across the two ends of the line 44 and a similar amplifier 50 is connected across the two ends of the line 46. The combination of each amplifier and its connected line constitutes an oscillator which will operate at a definite frequency fixed by the electromagnetic characteristics of the line and the amplifier. As the usual amplifier shifts by 180 degrees the phase of a wave passing therethrough, the delay line will generally be an odd number of half wavelengths long at the oscillating frequency. By employing substantially identical lines and substantially identical amplifiers the two oscillators may be designed to operate at the same frequency. For the purposes of the present invention, the oscillators of a pair are so arranged that the electromagnetic wave in line 44 circulates in the opposite direction of rotation as compared with the electromagnetic wave in the line 46. As long as there is no component of rotation of the coil 44 in the plane of the coil, there is no relativistic effect upon the frequency of oscillation in the coil 44. Likewise, as long as there is no component of rotation of the coil 46 there is no relativistic effect upon the frequency of oscillation in the coil 46. On the other hand, when there is such rotation of the lines 44, 46, a relativistic effect occurs which is opposite in its effect upon the two lines due to the opposite directions of propagation of the waves in the two lines. In one line, the wave is propagated in the direction of rotation of the line, while in the other line the wave is propagated in the direction opposite to the rotation of the line. The result is that the frequency of the oscillations in one line is increased while at the same time the frequency of the oscillations in the other line is decreased. The above holds similarly for the lines 108 and 110. A corollary result is that if the wave at a given point in one line is compared with the wave at a given point in the other line, the waves at these two points will continually change their phase relationship to each other as time goes on, whenever the frequencies of the two waves are not identical. The difference in frequency of the two waves, or the progressive change of phase relationship between them is utilized in the system described herein to control servo systems which in turn actuate the motors 34 and 36 to rotate the shafts 28 and 30 in the appropriate directions to reverse the rotations of the sensing coils. The reverse rotation continues as long as the original rotation and restores the space platform to an attitude that is the same as before the original rotation began. Thus the system illustrated maintains the angular position of the space platform in a constant direction in space regardless of rotation of the remainder of the apparatus.

A connection 51 is made from point 52 at the output of the line 44 to one input of a sum circuit 71 and to one input of a difference circuit 69; also a connection 61 is made from point 60 at the output of the line 46 to a second input of the sum circuit 71 and to a second input of the difference circuit 69. Suitable sum circuits and difference circuits may be constructed in known manner from combinations of transformers, pulse transformers, etc., and with waveguides, magic T junctions may be used for this purpose. In the embodiment shown in FIG. 1, the output of the difference circuit 69 is amplified in an amplifier 70 and the amplified wave is impressed upon a phase demodulator 76. To serve as a reference wave for the demodulation process in the demodulator 76, a wave of suitable phase is produced by shifting the phase of the output wave from the sum circuit. This wave from the sum circuit is of approximately the same frequency and phase as the waves in the delay lines but is 90 degrees out of phase with the waves impressed by the difference circuit upon the amplifier 70. To bring the sum wave into the desired phase, the sum wave, after being amplified in an amplifier 72 is passed through a 90 degree phase shifter 74. The output wave from the phase shifter 74 is combined in the phase demodulator 76 with the wave from the amplifier 70 to generate a control wave that varies in amplitude according to a function of the phase difference between the waves at the respective points 52 and 60. Harmonics and undesired modulation products generated in or passed by the demodulator 76 may be filtered out by means of a filter 78 connected to the output of the demodulator 76.

The filtered control wave from the filter 78 is impressed upon the input circuits of a pair of phase demodulators 80 and 81 by means of a connection 77. Reference waves for the respective demodulators are obtained from a resolver 82 which turns with the shaft 32 to generate a sine component and a cosine component of the frequency determined by the rate of rotation of the shaft 32.

FIG. 1–C shows a method and apparatus for holding the amplitudes of two oscillating circuits to a high degree of equality in order to effect a high degree of nulling in the difference circuit. The two circuits are assumed to be oscillating at the same frequency and to differ in phase by an angle $\theta$. A portion of the output from the sum circuit amplifier 72 and a portion of the output from the difference circuit amplifier 70 is fed into a phase demodulator 197. The output from the phase demodulator 197 is fed through a filter 198 to an amplitude control device 199 of suitable known kind which in turn is operatively connected to the amplifier 48 which sustains oscillations in the delay line 44. The output from the phase demodulator 197 is closely proportional to the difference between the amplitudes of the oscillations in the respective delay lines 44 and 46. The filter 198 serves to remove harmonics and other undesired modulation products. The output from the filter 198 is applied to the amplitude control 199 in the proper polarity to regulate the amplitude of oscillation in the delay line 44 in the proper direction to reduce or eliminate the difference in amplitudes of the oscillations in the two lines.

If A and B are the amplitudes of the respective oscillations, the difference wave may be expressed as $$A \sin(\omega t+\theta) - B \sin(\omega t-\theta)$$
$$= (A-B) \sin(\omega t+\theta) + B \sin(\omega t+\theta) - B \sin(\omega t-\theta)$$
$$= (A-B) \sin(\omega t+\theta) + 2B \cos \omega t \sin \theta$$

When this difference wave is phase demodulated against the sum wave $\sin \omega t$ as a reference carrier in the phase demodulator 197 the result is $$(A-B) \sin(\omega t+\theta) \sin \omega t + 2B \cos \omega t \sin \omega t \sin \theta$$

When this resultant wave is passed through the filter 198 the first term of the above expression gives a result proportion to $(A-B)$ and the second term contributes nothing. The action of the circuit is to make $(A-B)$ approach zero to a very high degree. The result is that two waves may be nulled in amplitude to a very high degree even though the waves differ slightly in phase. Suitable terminating impedances 171, 172, 173 and 174 are provided for the lines 44, 46, 108, and 110, respectively.

The signal from each pair of delay lines, such as lines 44, 46, and lines 108, 110, the two pairs being mounted in perpendicular planes, and rotated about a common diameter of the coiled lines as illustrated in FIG. 3, contains information on the relativistic phase change due to angular motion in two planes. An expression for the total signal including the two phase variations is $$A^2(\Delta\theta \cos \omega_2 t + \Delta\alpha \sin \omega_2 t)$$

where A is the amplitude of the voltage developed in the oscillating circuits, $\Delta\theta$ is the phase change due to the angular motion in one plane, say the horizontal plane, $\Delta\alpha$ is the phase change due to the angular motion in the second plane, say a vertical plane, and $\omega_2$ is the rate of rotation of the lines upon the shaft 32, in radians per second, say one revolution per second, for example. The expression shows how the response of the coils varies, in sinusoidal fashion, as the coils are rotated. When the plane of the coil lies in the horizontal plane, the phase change for the horizontal plane is maximum and the phase change for the vertical plane is zero and therefore not detected. If the coils are vertical, there is zero phase change detected due to the horizontal motion and maximum detected due to the vertical motion. The cosine term expresses the response due to the motion in the horizontal plane and the sine term expresses the response due to the motion in the vertical plane.

If the wave so expressed is phase demodulated in phase demodulator 81 with respect to a reference wave of the form $$\cos \omega_2 t$$

The output is $$\frac{A^2 \Delta\theta + A^2 \Delta\theta \cos 2\omega_2 t + A^2 \Delta\alpha \sin 2\omega_2 t}{2}$$

The wave so expressed may be passed through a low pass fitler to yield a single term $$A^2 \Delta\theta/2$$

thus isolating and detecting the phase change due to the horizontal motion alone.

By a similar phase demodulation of another portion of the same wave in the phase demodulator 80 but with respect to a reference wave of the form $$\sin \omega_2 t$$

followed by filtering in a filter 84, the phase change due to the vertical motion alone may be isolated and detected to yield $$A^2 \Delta\alpha/2$$

The output of the filter 85 is impressed upon an integrator 86 together with a wave derived from the waves in the second pair of delay lines 108, 110. The output of the filter 84 is impressed upon an integrator 186 similar to the integrator 86. The integrated wave from the integrator 86 is impressed upon a servo amplifier 92, the amplified output of which is used to drive the motor 34, which in turn drives the gear train 40 and the shaft 28.

The assembly of apparatus shown enclosed by a dot-dash line 21 is to be duplicated in the block 23, the two assemblies cooperating in the stabilization of the space platform in response to phase shifts developed by rotations of the delay lines 44, 46, 108, and 110 about their common diameter and the duplicated components for that reason are not depicted in block 23 in the drawing.

A connection 151 corresponding to the connection 51 to the block 21 is made from a point 116 at the output of line 108 to one pair of inputs of the sum and difference circuits in block 23; and a connection 161 corresponding to the connection 61 to the block 21 is made from a point 118 at the output of line 110 to the second pair of inputs of the sum and difference circuits in block 23. A connection 177 corresponding to the output connection 77 from block 21 is made from block 23 to a pair of phase demodulators 180, 181 similar to phase demodulators 80, 81. The same reference wave from resolver 82 is furnished to phase demodulator 180 as is furnished to phase demodulator 80. The second reference wave from resolver 82 is supplied both to phase demondulator 181 and to phase demodulator 81. The output waves from the demodulators 180 and 181 are passed through filters 184 and 185 respectively. The filtered wave from filter 184 is passed over a connection 88 to the input of the integrator 186, and the filtered output of filter 185 is supplied to the input of the integrator 86. The integrated output wave from the integrator 186 is impressed upon a servo amplifier 192 which actuates the motor 36, the gear train 42 and the shaft 30.

FIG. 1-B shows a sound wave line 193 which together with a pair of transducers 194 and 195 may be substituted for an electromagnetic transmission line, for example for any or all of the delay lines 44, 46, 108 and 110. The transducer 194 translates electromagnetic to sound waves while the transducer 195 translates sound waves to electromagnetic waves. The loop for the relativistic oscillator is completed through an amplifier 196. The line 193 is to be arranged in the form of a complete or nearly complete loop enclosing an area having a projection in a plane normal to the sensitive axis so that the sound waves in line 193 are subject to the relativistic effect of rotation as in the case of the loops for electromagnetic waves or energy disclosed herein.

FIG. 7 shows diagrammatically a nulling and detecting system which has been built and successfully operated. A 5-microsecond delay line 700 was coiled in a three and one-half inch diameter coil and potted in a heavy mu-metal box 702 to eliminate outside field effects. A one megacycle per second crystal controlled oscillator 704 was connected to one end of the line 700 through a 1700 ohm metallized resistor 706, and to the other end of the line 700 through a phase reversing pulse transformer 708 and another similar 1700 ohm resistor 710. The outputs from the two ends of the line 700 were combined by means of a pair of matched 10,000 ohm resistors 712 and 714. Nulling of the phases of the two outputs was obtained by means of a variable 10 ohm resistor 716 in series with the resistor 706, and by means of a one micromicrofarad variable capacitor 718 connected from ground to the end of the line opposite from the resistor 716. The one magacycle per second null wave was passed from the junction of the resistors 712 and 714 through a shielded line 720 to a detector 722 which was served by a local oscillator 724 adjusted to give a beat frequency of 400 cycles per second. When the oscillator 724 was turned on, a 400 cycle per second signal was observed when the phases of the outputs from the line 700 were not exactly nulled. A loud speaker 726 was provided with which to hear the 400 o.p.s. tone. The output of the detector 722 was also connected through a narrow band pass filter 728 tuned for 400 o.p.s. tone. The output of the detector 722 was also connected through a narrow band pass filter 728 tuned for 400 o.p.s. to a sensitive alternating current voltmeter 730 and an oscilloscope 732. The filter 728 served to greatly reduce the noise content of the 400 o.p.s. signal. This signal was observed by three means, namely the loudspeaker, the voltmeter and the oscilloscope. All the equipment was placed on a platform which could be very smoothly rotated. It was observed that the signal increased from the null value when the platform was rotated.

The wavelength difference between the two outputs of the line 700 was computed from the formula $$\Delta\lambda = \frac{2V\lambda}{C}$$

for a peripheral velocity V of three feet per second and equal to five wavelengths, giving a wavelength difference of $3 \times 10^{-8}$ wavelength. The ratio of the maximum signal to the signal at a null of $\Delta\lambda$ was computed from the formula $1:2\pi\Delta\lambda$ to be $5.3 \times 10^6$ to one.

The output of the oscillator 704 was 3 volts. The delay line 700 was excited through approximately its own characteristic impedance, so that the input to the line was about 1.5 volts. The output of the line was also about 1.5 volts since the loss in the line was small at one megacycle per second. Thus, the difference had a maximum possible value of 1.5 volts. The attenuation through the shielded line 720 to the detector was about a factor of 5, reducing the maximum detector input to about 0.3 volt. The equivalent noise voltage at the input of the detector was computed to be about $3 \times 10^{-8}$ volts, so that the ratio of maximum input to minimum input was a factor of $10^7$. When the platform was rotated, the signal voltage approximately doubled as expected. The signal applied to the input of the detector during rotation was computed to be about $5.7 \times 10^{-8}$ as compared to the noise voltage of about $3 \times 10^{-8}$ volts.

Care was taken to provide proper mechanical support for the delay line and all the components were anchored down securely. Precision dials and carefully selected components were used. The temperature of the apparatus was allowed to reach equilibrium.

The precision of rotation responsive relativistic devices may be enhanced further by superimposing self-sustained traveling waves upon a single transmission loop. FIG. 8 shows a single loop for this purpose. A circular continuous waveguide is represented in diagrammatic form at 800. The line has a circumference of one wavelength of the oscillations in the line. The line is provided with probes at points A, B, C, D, E, and G as indicated, the points A, B, C and D being spaced apart by one-quarter wavelength. A one-way amplifier 804 connects points at A and C in one direction and another one-way amplifier 808 connects these points in the opposite direction. Also one-way amplifiers 806 and 810 connect points B and D in the two opposite directions. The arrangement forms a bridge circuit in which the amplifiers 804 and 808 are in conjugate branches with respect to the amplifiers 806 and 810 so that feedback from the output of one pair of amplifiers to the input of the other pair of amplifiers may be reduced to a minimum. The two probes at each point are arranged for minimum coupling directly across the waveguide. In addition, an action analogous to that of a directional coupler occurs whereby a wave circulating in a given direction around the loop, A, B, C, D amy enter any of the four amplifiers and after amplification will resume circulation around the loop in the same given direction. This is notwithstanding the fact that the output of each amplifier applies two waves to the loop which waves are directed in opposite direction around the loop. Due to the directional coupling effect, the wave which leaves one amplifier, say amplifier 804, in the undesired direction is matched by a similar wave which leaves amplifier 806 going also in the undesired direction. These two waves differ in phase by a quarter of a cycle as they emerge from the respective amplifiers and their points of emergence are a quarter wavelength apart around the loop. Therefore at any point in the loop where these waves coexist, they are a half cycle out of phase with each other and cancel each other out. The same result holds for waves which circulate originally in the opposite direction to those just considered. In both cases, the wave, regardless of its direction of circulation may pass through the amplifiers and be returned to the loop, whereupon the amplified wave will circulate only in the same direction around the loop as the original wave before amplification. It will be noted that the waves which circulate in the two directions not only traverse the identical transmission loop but also pass through the same identical amplifiers.

In the absence of rotation, the waves circulating in opposite directions through the loop circuit of FIG. 8 being of the same frequency, will form a standing wave pattern in the loop circuit. Rotation of the loop about an axis that has a component perpendicular to the plane of the loop will, by virtue of the relativity effect, cause the frequencies of the two circulating waves to depart from equality and cause a continual shifting of the standing wave pattern, so that the null points of the standing wave pattern will progress around the loop. In FIG. 8, null points are represented at E and G, intermediate between B and C, and A and D, respectively. Maximum and minimum amplitudes of the standing wave pattern occur at F and H, intermediate between C and D and A and B, respectively. A null detector 812 is shown connected between the null points E and G.

Reference carrier for the null detector 812 may be picked off from the loop 800 at or near the point H (or point F) and fed over a path 818 to the detector 812.

The general form of the traveling waves set up in the loop 800 is given by $$Ve^{j\omega t} = Ae^{-\alpha z}e^{j(\omega t - \beta z)} + Be^{\alpha z}e^{j(\omega t + \beta z)}$$

where the first term on the right represents a wave traveling in the positive Z direction while the second term represents the wave traveling in the opposite direction. These two waves are exactly the ones desired. A standing wave pattern is set up by these two waves as they add and subtract from one another.

Null points occurs at the locations specified by $$l_2 = \left(\frac{\theta - \phi}{4\pi} \pm \frac{2n+1}{4}\right)\lambda$$

using the expressions $$V^{-1} = |A|e^{j(\phi + \beta 1)} + |B|e^{j(\theta - \beta 1)}$$

$$\beta = \frac{2\pi}{\lambda}$$

as shown in "Microwave Transmission Circuits," by Ragan, published by McGraw-Hill Co., pp. 11 and 17.

The frequency is determined by the resonant frequency of the line comprising the transmission loop. In the case of a coaxial line loop of circumference an integral number of wavelengths, the fundamental resonant mode is the one that prevails. Each mode has its characteristic propagation velocity, which together with the length of the path determines the frequency of the oscillations. The frequency is inversely proportional to the path length. The frequency difference due to rotation, on the other hand is approximately proportional to the path length difference.

For small frequency differences, the apparent effect is a phase change.

It is very important that the paths be exactly the same length as nearly as possible, in the absence of the rotation that is to be detected. This equality is promoted by using the same piece of line for both paths and the same amplifiers to sustain the oscillations in both paths.

If the gain and phase shift in the four amplifiers are the same in each, conditions are right for exact cancellation of the waves which tend to traverse the loop in the wrong direction. If they are not the same, the undesired wave remaining will merge with the desired wave traveling in its direction with the result that the phase shift to be detected will be diminished. This type of error, however, is not as serious as a frequency difference existing between the two oscillations in the absence of rotation.

Two amplifiers a quarter wavelength apart, for example amplifiers 804 and 806, are sufficient to balance out waves traveling in the undesired direction. The use of four amplifiers as shown is advantageous in tending to hold the total gain of the amplifiers constant even though the phase relation between the waves changes. When the phase changes, the amplitude at one pair of amplifiers increases while the amplitude at the other pair decreases. Thus the conductance of one pair decreases and that of the other pair increases. Over a small range of changes the effect is linear and the total gain of the circuit is unchanged. If the gain were allowed to change, the phases would change in such manner as to require the minimum amount of power to be supplied to the system. As this minimum occurs when the phases are the same, there would be a tendency for the two waves to pull into phase. This tendency is reduced by using four amplifiers. An additional advantage in using four amplifiers instead of two is that, since the spacings between amplifiers are equal, the attenuations in the line segments between amplifiers are also equal, thus promoting exact cancellation of undesired waves.

Adjustable tuning stubs 814 and 816 are shown at points F and H respectively to balance out the undesired reflected waves due to the irregularities in the line or to the presence of the amplifiers, or due to other causes. It is to be understood that additional tuning stubs or equivalent tuning means are to be added as needed and that such tuning devices may be placed at any suitable positions around the loop.

FIG. 9 shows an arrangement employing a loop transmission line 900, a full wavelength long. It is excited into a standing wave pattern by means of four tunnel diodes 902, 904, 906 and 908 coupled to the line a quadrant apart by probes 910, 912, 914 and 916, at points A, B, C, and D, respectively. The line 900 is mounted for rotation upon a shaft 920.

The tunnel diodes serve as negative resistance elements to offset the positive resistance losses in the line 900, thereby sustaining traveling waves in the line. The traveling waves traverse the line in two opposite directions, thereby setting up a standing wave pattern in the line. Maximums will be formed at points midway between A and B, and midway between C and D, and nodes at points E and F.

The loop 900 is preferably circular and should be as free as possible from any structural irregularities or any deviations from a smooth continuous path for the waves to be employed. Tuning stubs are understood to be used wherever required.

A difference wave picked up across points E and F is fed through a coupling transformer 922 to a high impedance amplifier 924 and thence to a mixer 926 along with a local carrier wave from an oscillator 928. The output wave from the mixer 926 is amplified in an intermediate frequency amplifier 930 to obtain a signal input wave for a phase demodulator 932. This signal wave together with a reference carrier wave produces an output wave in the phase demodulator, which output wave is passed through a low pass filter 934 to an integrator 936. The output from the integrator is impressed upon a servo amplifier 938 to develop a control current which is supplied to a motor 940 for driving the shaft 920. Reference carrier for the phase demodulator 932 is obtained by picking off a wave of maximum intensity from a midpoint between C and D by means of a high impedance amplifier 942. The amplified wave is impressed upon a mixer 944 supplied by local carrier from the carrier oscillator 928. The output wave from the mixer 944 is amplified in an intermediate frequency amplifier 946. The intermediate frequency wave from the amplifier 946 is subjected to a 90° phase shift in a phase shifter 948 to obtain the proper phase to effect phase demodulation of the intermediate frequency wave in the phase demodulator 932.

The waves traveling in the two directions in the line 900 travel the same path and the sum and difference waves are provided inherently by the formation of a standing wave pattern in the line. With this sort of arrangement it is not necessary to introduce a deliberate rotation of the line additional to that about shaft 920 in order to compensate for drifts in the characteristics of circuit components. The shift in the null point due to the relativistic effect is increased due to the continued circulation of the waves around and around the loop while at the same time a shift in the null point due to drift is not increased by the continued circulation, thereby reducing the relative effect of drift. The devices may be made smaller and lighter due to the elimination of separate sum and difference circuits as well as due to the elimination of means to rotate the circuit to compensate for drift.

FIG. 10 shows an embodiment in which resistors are employed instead of transmission lines of the coaxial or waveguide types. Four resistor windings 1001, 1002, 1003, and 1004 are connected together to form a Wheatstone bridge circuit having bridge corners A, B, C and D. The resistors comprise multi-turn windings which are assembled upon a circular spool 1006, shown in FIG. 10–A. The spool is rotatable by means of a shaft 1008 attached thereto. The windings 1001 and 1003 are wound in a counterclockwise direction from A to B and from C to D, respectively, as viewed in FIG. 10–A. The windings 1002 and 1004 are wound in the clockwise direction from B to C and from D to A, respectively. When rotation occurs about an axis that has a component normal to the plane of the windings, the resistance values of the windings 1001 and 1003 undergo a change and the resistance values of the windings 1002 and 1004 undergo an opposite change. If the bridge is initially balanced in the absence of rotation, the bridge is unbalanced when rotation occurs. Rheostats may be provided in known manner for adjusting the bridge to balance, but are omitted in the drawings for the sake of clarity.

A carrier frequency wave may be impressed across between points A and C of the bridge circuit by means of an oscillator 1010, which may be a power supply source of 60 cycles per second, although other frequencies may be used. The unbalanced output may be taken from across the points B and D through a tuned transformer 1012, which may provide a voltage step-up of, for example, 100 to 1. The unbalanced output may be amplified in an amplifier 1014 and impressed upon the input of a phase demodulator 1016 along with a reference carrier wave obtained across points A and C and shifted 90° in a phase shifter 1018. The demodulated output wave from the demodulator 1016 may be integrated in an integrator 1020, which due to the relatively low frequency involved may be a simple resistor-capacitor combination. The integrated output is passed through a servo amplifier 1022 and used to drive a motor 1024 and the shaft 1008.

The resistive windings 1001, 1002, 1003 and 1004 may have any desired resistance value, for example 1000 ohms each preferably wound from a single batch of low-temperature coefficient wire. The source 1010 may produce 30 volts as an illustrative example.

Due to the relativistic effect of rotation of the windings, the apparent length from A to B is longer during one-half the cycle than during the other half-cycle. Similarly, the apparent length from B to C varies but at an opposite part of the cycle. The lengths from C to D and from D to A likewise vary.

The time constant of the integrator 1020 may be made in the order of an hour, thereby greatly reducing the circuit noise and increasing the useful output of the demodulator.

The resistance change, being proportional to the change in length of the resistance coil due to the rotation, is $$\Delta R = \frac{2VR}{C}$$

when the bridge is unbalanced by the relativistic effect of rotation, $$E_o = \left(\frac{R+\Delta R}{R-\Delta R} - 1\right) E_s$$

$$= \frac{2\Delta R}{R-\Delta R} E_s$$

where $E_o$ is the detected unbalance voltage and $E_s$ is the voltage of the source, computed for one bridge arm. For the two arms, $$E_o = \frac{4\Delta R}{R-\Delta R} E_s \doteq \frac{4\Delta R}{R} E_s$$

substituting herein the above value of $\Delta R$, $$E_o = \frac{8V}{C} E_s$$

FIG. 11 shows a full wavelength long transmission loop 1100 and a broken transmission path 1102 of somewhat shorter length. Both the loop and the broken path may be enclosed within a shielding outer conductor, indicated at 1104, in the general manner of a shielded two-conductor line. The path 1102 may be non-reflectively terminated at the ends by matching load resistors 1106 and 1108, respectively. A diode 1110 is connected across the path 1102 at its midpoint. Directional coupling is indicated schematically at 1112 and 1114 between the loop 1100 and the path 1102 at either side of the midpoint of path 1102, which coupling is to be interpreted as operating continuously all along the adjacent conductors. Tuning stubs are understood to be provided wherever required.

In the operation of the arrangement shown in FIG. 11, waves travel from the point of application of the diode 1110 in opposite directions in the path 1102 to the respective non-reflective terminations and so do not return to the diode. The induction from path 1102 to the endless loop 1100, being of a uni-directional character as known to the directional coupling art, permits the section of path 1102 between the diode 1110 and the load resistor 1106 to feed a wave into the loop 1100 in one direction only. Similarly, the section of path 1102 between the diode 1110 and the load resistor 1108 feeds a wave into the loop 1100 also in a single direction only. The two waves thus fed into the loop 1100 traverse the loop 1100 in opposite directions as required, using a single loop for the two waves and a single amplifier. The waves in the loop 1100 are induced without contact between the loop 1100 and the path 1102 and with a minimum of disturbance to the electrical characteristics of the loop 1100, thereby maintaining a high value of Q in the loop 1100 and similarity of the characteristics of the paths in the two directions.

FIG. 12 shows an arrangement employing a loop transmission line 1200, one or more full wavelengths long, which may be initially excited into generating a standing wave pattern by means of a negative resistance element 1202 connected to the point D of the loop through a switch 1218. The line is kept at a very low temperature in a cryogenic environment within a heat insulating casing 1204, such as a Dewar vessel filled with liquid helium. By inducing superconductivity in the loop 1200, oscillations once started in the loop will continue for a long period without addition of power. Therefore, after energization of the loop the switch 1218 may be opened. Since detection of departures from a null condition will require extraction of some power from the system, the element 1202, while not needed continuously, may be connected periodically to maintain the oscillations. Superheterodyne receivers 1220 and 1222 are provided and are served with local carrier oscillations by means of an oscillator 1224. The signal input to the receiver 1222 may be connected to point C of the loop by means of a switch 1226 while the signal input to the receiver 1220 may be connected to the point D of the loop by means of a switch 1228. To conserve power in the loop 1200 the switches 1226 and 1228 may be left open except when the device is being used. The wave impressed upon the receiver 1220 from the point D of the loop is made to be the difference wave by selecting the point D to be a nodal point of the standing wave pattern. The point C is located a quarter wavelength from the point D so that the wave impressed upon the receiver 1222 is a sum wave of proper phase required for phase demodulating the difference wave. To effect the phase demodulation, the output waves from the receivers 1220 and 1222 are combined in a phase demodulator 1230. The demodulated output is passed through a low pass filter 1232 and impressed upon a servo amplifier 1234 which in turn energizes a motor 1236 to turn a shaft 1238 to rotate the line 1200 and vessel 1204 as through a gimbal mounting in such direction and amount as to minimize the net rotation of the line.

The loop 1200 is preferably circular, comprising a continuous length of coaxial cable or of waveguide. It should be as free as possible from any deviations from a smooth continuous transmission path. It is understood that tuning means are to be provided wherever needed. To promote superconductivity in the line, a suitable material for the line is $Nb_3Sn$. The temperature of the cryogenic environment should be below the critical temperature of the material for superconductivity, 18° K. in the case of $Nb_3Sn$. A temperature well below this critical point is readily obtained by means of a bath of liquid helium.

Upon connection of the negative resistance element 1202 to the point D of the loop 1200 a set of traveling waves is generated in the loop, one wave traveling clockwise around the loop and the other traveling counterclockwise, which is precisely the situation that is desired. These waves set up a standing wave pattern in the loop. Assuming that the loop constitutes one wavelength for the impressed oscillations, there will be a maximum at point C and a node at point D.

Instead of a negative resistance element, a one-way amplifier may be employed, in which case the input and output of the amplifier are connected to points of the line where the phases are 180 degrees apart.

By means of switches 1240 and 1242 higher frequency oscillations from an oscillator 1244 may be impressed upon the loop 1200 through the element 1202 so that several wavelengths of oscillations may be built up in the loop. The frequency of the oscillator 1244 may be for example one hundred times the natural frequency of the loop so that the electrical length of the loop is made to be one hundred wavelengths instead of a single wavelength, thereby increasing the sensitivity of the device.

When the system has been adjusted to have a node at the point D in the absence of rotation of the line about the axis of the shaft 1238, any rotation of the line about an axis having a component in this axis will cause the node to move away from the point D. Thus, in the absence of rotation, no signal is impressed upon the receiver 1220, and rotation will be accompanied by the appearance of a signal input to the receiver.

While structural irregularities in the line should be avoided as far as possible, residual unwanted reflected waves may be made ineffective by means of compensating waves introduced into the main line by adjustable stub lines, or equivalent means making use of known techniques.

To provide a reference carrier wave for the phase demodulator 1230, the receiver 1222 picks off a wave from the line at a maximum amplitude at point C and passes an output wave through a 90° phase shifter 1246 to the phase demodulator. The output of the receiver 1220 is passed to the phase modulator as a signal input. The output of the phase demodulator constitutes a control signal, and is filtered to remove the undesired higher frequency components, before it is fed to the servo amplifier for use for control purposes.

The Dewar vessel 1204 may contain three lines like line 1200, with their axis mutually perpendicular, thereby forming a three-axis system. The vessel 1204 may be mounted in gimbals in known manner. The form of device shown in FIG. 12 is particularly well adapted for use as an indicator of angular displacement. That is, when there occurs an angular displacement of the internal wave system relatively to the line, the null point is displaced along the line and a voltage appears at the output of the null detector, which voltage may be read off as a measure of the angular displacement or used in any desired manner to effect an operation in response to the angular displacement.

FIG. 13 shows another form of resistive bridge device. The windings 1301, 1302, 1303 and 1304 are placed in the same arrangement as shown in FIG. 10-A upon a shaft 1308. Currents through the windings may be supplied by a direct current source illustrated as a battery 1310 as shown or an alternating current source may be used. The windings are rotatable about a second shaft 1312 by means of a motor 1314 driven by an alternating current source 1316. Rotation of the windings by the motor 1314 generates an alternation in the unbalanced current from the bridge that is proportional to the rotation of the device about the axis of the shaft 1308. The shafts 1308 and 1312 are mutually at right angles to each other. The alternating signal is impressed upon an amplifier 1318 by way of a capacitor 1320. The amplified signal is phase demodulated in a phase demodulator 1322 with reference to a carrier wave from the source 1316. The phase demodulated signal from the demodulator 1322 is integrated in an integrator 1324 and the resulting signal is passed through a servo amplifier 1326 to drive a motor 1328 mounted upon the shaft 1308.

The balance required in the resistors can be drastically reduced by means of the rotation about the axis 1312. In the presence of this rotation the bridge output is $$E_0 = \frac{8V}{C} E_s \cos \omega t$$

where $\omega$ is the angular frequency of the rotation about the axis 1312. The output of the phase demodulator 1322 is $$\frac{8V}{C} E_s$$

Any of the arrangements such as shown in FIGS. 7–13 may be used as rotation detecting devices in the systems illustrated in FIGS. 1, 1–A, 3, and 4, or similar systems. The increase in precision obtained by superposing waves traveling in opposite directions in the same loop and sustained by the same amplifiers may, if desired, be used to permit the elimination of the rotation of the transmission loops upon the shaft 30, thus obtaining a substantial simplification of the device with accompanying reduction of cost and improvement in reliability.

The arrangements shown in FIGS. 8, 9, 11 and 12, in which the oscillations occur in one and the same line and are self-maintained, have the advantage that the waves traveling in the two directions are automatically synchronized at all times in the absence of rotation. This synchronization is not effected by drifting of the frequency determining parameters of the line. These arrangements are very sensitive to rotation, since rotation causes a shift in the null points of the standing wave pattern.

The self-oscillating arrangements shown in FIGS. 8 9, 11 and 12 have utility as improved oscillators apart from and in addition to their use in rotation detecting systems. By means of tuning stubs or equivalent tuning means the oscillator may be tuned up while at the same time reflections are minimized until a precise standing wave pattern is produced. The attainment of the standing wave pattern may be checked by means of the oscillator itself without the need for external testing apparatus other than a phase shift detecting system such as is shown in the figures. For test purposes, a small vibratory angular motion may be imparted to the oscillator, for example, a displacement of one-thousandth of an inch at one cycle per second produced by means of an auxiliary oscillator 960, of frequency one cycle per second for example, connected to the input of the servo amplifier 938 in the system of FIG. 9, or an auxiliary oscillator 1260 connected to the input of the servo amplifier 1234 in FIG. 12, to cause vibration of the rotors of motors 940 and 1236, respectively. With the relativistic oscillator thus vibrating the tuning devices may be manipulated. Reduction of undesired reflections is indicated by increased amplitude of response from the phase shift detecting system due to the relativistic effect of the angular motion as the null of the standing wave becomes more pronounced. Tuning may be continued until a maximum response is obtained. In routine testing, the maximum response may be determined by trial or by calculation, and tuning may be continued until the predetermined response is obtained.

Null points for harmonic frequencies will be found at the same location as a null point for the fundamental frequency. Accordingly, oscillations including one or more harmonics may be set up in the oscillating loop by suitable initial excitation. Even a square wave standing wave pattern may be obtained or closely approximated. The same testing routine is applicable as for a single frequency oscillator.

Reverting to systems employing more than one oscillating loop, as for example in FIGS. 1 and 1–A, the output wave from the sum circuit may be additionally used to compensate the drift of circuit parameters to keep the relativistic oscillators in phase except for the desired phase differences that are caused by the relativistic effect of rotation of the oscillating loop. When dealing with such small phase differences as are contemplated herein, the keeping of the oscillators normally in phase requires very special attention. The drift is due to temperature, ageing, and acceleration forces as well as misalignment of circuits, or other causes. One of the measures taken herein to reduce the effects of drift is the rotation of the two oscillating loops of a pair about an axis orthogonal to the sensitive axis, that is, the rotation by means of the shaft 32. By this means, the desired phase difference $\Delta\theta$ is made a function of the rotation rate $\omega_2$ of the shaft 32. It will be assumed that an extraneous phase variation $\epsilon \cos \omega_3 t$ is present in one oscillator of a pair. The output of this oscillator may be expressed as $$A \sin (\omega_1 t + \Delta\theta \cos \omega_2 t + \epsilon \cos \omega_3 t)$$

while the output of the other oscillator of the pair may be expressed $$A \sin (\omega_1 t - \Delta\theta \cos \omega_2 t)$$

Here, $\epsilon$ is the phase shift due to the extraneous cause in the first oscillator and $\omega_3$ is the assumed frequency in radians per second of the disturbance causing the phase shift.

It is desirable that the effects of the phase variations at the frequencies $\omega_2$ and $\omega_3$ be separated and for that purpose, the sum wave is differentiated in the differentiator 98. The sum wave has the form $$2A \cos\left(\Delta\theta \cos \omega_2 t + \frac{\epsilon}{2} \cos \omega_3 t\right) \sin\left(\omega_1 t + \frac{\epsilon}{2} \cos \omega_3 t\right)$$

Since $\Delta\theta$ and $\epsilon$ are both assumed to be small, the cosine factor in the preceding expression may be replaced by unity, thus reducing the form of the sum wave to $$2A \sin\left(\omega_1 t + \frac{\epsilon}{2} \cos \omega_3 t\right)$$

Differentiation of this wave gives $$2A\left(\omega_1 - \frac{\omega_3 \epsilon}{2} \sin \omega_3 t\right) \cos\left(\omega_1 t + \frac{\epsilon}{2} \cos \omega_3 t\right)$$

To provide a reference wave for the phase demodulator 100, a portion of the sum wave before differentiation is given a 90 degree phase shaft in the phase shifter 74. Impressing the reference wave together with the differentiated sum wave upon the phase demodulator 100 produces an output wave from the phase demodulator of the form $$2A^2\left(\omega_1 - \frac{\omega_3 \epsilon}{2} \sin \omega_3 t\right)$$

The latter wave is integrated in the integrator 102 to produce a wave of the form $$2A^2\left(\omega_1 \Delta t + \frac{\epsilon}{2} \cos \omega_3 t\right)$$

The non-alternating term $$\omega_1 \Delta t$$

may be removed by means of a blocking condenser in the output circuit of the integrator. The alternating portion of the wave is given a phase inversion in the phase inverter 103 and fed into the reactance circuit 104 wherein it produces a varying capacitive reactance across one of the delay lines in opposite phase to the assumed disturbance. The effect is that the output wave of the disturbed line changes to the form $$A \sin(\omega_1 t + \Delta\theta \cos \omega_2 t)$$

Rough phasing of the two oscillators, using separate transmission loops can be maintained by using a suitable amount of impedance coupling between the oscillators. An important factor is that the characteristics of the two oscillators do not change periodically with time, which would result in an error signal which could not be eliminated or compensated.

Extraneous phase differences may be further reduced by feeding the components that are lower in frequency than the $\omega_2$ rotation rate as well as components well above that rate into the reactance circuit 104 by way of a filter 105 which may be a band suppression filter which suppresses the rotation frequency and principal modulation products thereof. By this means the two oscillators will be kept tightly in phase except for the required phase signal, thereby keeping the drift effect of the components under control.

The filter 105 may be followed by an integrating action which will accumulate a gradually increasing error correcting signal over a relatively long period of time which finally becomes sufficiently great to alter the reactance of the reactance circuit 104 in the amount required to restore the oscillators to equal frequency and identical phase. It should be noted also that both of the oscillators should be carefully designed to reduce extraneous phase variations to a satisfactory value.

One important effect of introducing these phase modulations into the oscillating lines is to insure that the two oscillators of a pair shall remain closely locked together with respect to frequency and phase while permitting only sufficient phase differences to develop as are required in order to effect sufficient control of the attitude of the space platform. In systems using the identical transmission loop and identical amplifiers for the two oscillators, phase and frequency lock of the desired type is inherent without need for the control measures just described.

In systems which utilize very small detected effects, as is the case in the systems described herein, the signal-to-noise level is of great importance. Thermal noise is one factor. Calculations given above indicate that it is not a serious problem. Another source of noise is the drifting of the phase relationship between two oscillators where separate oscillating circuits are employed. In this connection, coaxial lines have an advantage in that they possess inherent characteristics conducive to close tracking of one circuit with another. A change in temperature will cause the frequency difference between two oscillators to change, thereby causing error. Where necessary, the oscillators may be temperature controlled by known methods.

Distortion of the transmission line elements due to acceleration can also cause error. The amount can be minimized by careful design and by maintaining symmetry.

In order to increase the amplification and to improve the signal-to-noise ratio an advantage may be gained by superimposing still another phase modulation upon the oscillating delay lines, at some convenient frequency, for example 1000 cycles per second as illustrated in schematic form in FIG. 1–A. Let this frequency be designated $\omega_4$ measured in radians per second. To consider the effect of this additional phase modulation it will be sufficient to represent the wave in one delay line by $$A \sin(\omega_1 t - \theta - m \cos \omega_4 t)$$

and the wave in the other delay line by $$A \sin(\omega_1 t + \theta + m \cos \omega_4 t)$$

When these waves are subtracted in a difference circuit, amplified, and detected in a square law detector, there is obtained a wave which may be represented by $$[A \sin(\omega_1 t + \theta + m \cos \omega_4 t) - A \sin(\omega_1 t - \theta - m \cos \omega_4 t)]^2$$

This wave includes terms at the frequency $2\omega_1$, which are readily filterable, leaving the following:

$$A^2 - A^2 \cos(2\theta + 2m \cos \omega_4 t)$$

which is equivalent to $$2A^2 \sin^2(\theta + m \cos \omega_4 t)$$

Since $\theta$ and $m$ are assumed to be very small angles, the sine function is approximately the same as the angle to which the sine function refers. Therefore the sine square term may be expressed as $$2A^2(\theta + m \cos \omega_4 t)^2$$

This latter expression may be expanded into $$2A^2\left(\theta^2 + \frac{m^2}{2} + \frac{m^2}{2} \cos 2\omega_4 t + 2m\theta \cos \omega_4 t\right)$$

reference wave $$\cos \omega_4 t$$

the result is $$2A^2 m\theta$$

except for harmonic terms which may be filtered out. The effect is that the detected wave has been multiplied by the factor $m$.

FIG. 1–A shows a block 25 comprising apparatus which may be substituted in blocks 21 and 23 for the arrangement shown in detail in block 21, in FIG. 1, in order to introduce the above described signal multiplying effect. In block 25 the apparatus for generating a sum wave, operating upon the sum wave, and impressing the resultant wave upon the input of the reactance circuit 104 is the same as shown in block 21. The circuits for operating upon the difference wave however, are shown in modified form in FIG. 1–A. The output from the amplifier 70 is subjected to detection in a square law detector 105'. Harmonics of the delay line frequency and other unwanted modulation products generated in the detector 105 are filtered out by a filter 106 connected to the output of the detector. The filtered wave is impressed upon a phase demodulator 107. The purpose of the phase demodulator 107 is to remove a phase modulation that is deliberately introduced into the delay lines 44 and 46. This phase modulation is introduced into the reactance circuit 104 by means of an oscillator 108. The oscillator is connected also to the phase demodulator 107 to which it supplies the necessary reference wave. The phase demodulated wave from the phase demodulator 107 is passed through the filter 19 over the connection 77 to the phase demodulators 80 and 81. As above described, the output of the phase demodulator contains a multiplying factor $m$ introduced by the added phase modulation.

FIG. 3 shows how the apparatus shown schematically in FIGS. 1 and 1–A may be mounted in a vehicle in the manner of a gyroscope mounting.

In FIG. 3 a bell-shaped cover 300 is shown fitted over a cylindrical base member 302. The member 302 may contain amplifiers, demodulators, filters, and all other components that need not be carried upon the space platform. The space within the base 302 and the space within the cover 300 may be separated by a plate 304 upon which latter may be mounted support members 306 and 308 for supporting the outer gimbal ring 310 of a three-gimbal support for the space platform. A drive motor 312 for rotating the gimbal 310 has its stator mounted upon the support 306 and its rotor upon a shaft 314 attached to the gimbal 310. A similar shaft is provided at the opposite side of the gimbal 310 hidden from view in the figure. The shafts run in bearings of suitable type in the supports 306 and 308 respectively. An intermediate gimbal 316 is mounted in the usual manner upon shafts perpendicular to the line of shaft 314, one of the former shafts, being shaft 30. The drive motor 36 for rotating the gimbal 316 has its stator mounted upon the gimbal 310 and its rotor mounted upon the shaft 30. A shaft similar to shaft 30 is provided at the opposite side of gimbal 310 hidden from view in the figure. Shaft 30 and its counterpart run in bearings in the gimbal 310. An inner gimbal 320 is mounted in the usual manner upon shafts perpendicular to the line of the shaft 30, one of the former shafts being shaft 28. Shaft 28 and its counterpart run in bearings in the gimbal 316. The drive motor 34 for rotating the gimbal 320 has its stator mounted upon the gimbal 316 and its rotor mounted upon the shaft 28. A shaft similar to shaft 28 is provided at the bottom of gimbal 316 hidden from view in the figure.

Perpendicular to the shaft 28 and rigidly attached to the gimbal 320 is a plate 324 which may be termed the space platform. The plate 324 is preferably placed at an intermediate position between the top and bottom of the gimbal 320 as viewed in the figure, to provide room for mounting additional components upon both surfaces of the plate 324. Shown mounted upon the upper face of the plate 324 are support members 326 and 328 which serve in turn to hold suitable bearings which carry the shaft 32 that extends parallel to the plane of the gimbal 320. Mounted upon the shaft 32 between the supports 326 and 328 are three mutually perpendicular rings 330, 332, and 334, a casing 336 containing diode oscillators 48 and 50, and also a set of slip rings shown generally at 338 for taking off electrical potentials from the circuits that rotate with the shaft 32. For the sake of clarity, brushes as well as details of the slip rings are omitted from the drawing. These are of known form. The ring 332 supports coiled delay lines 44 and 46 and the ring 334 supports coiled delay lines 108 and 110.

The drive motor 38 is provided for rotating the shaft 32. A gear 340 on the motor shaft meshes with a gear 342 attached to the shaft 32. The latter shaft in addition to rotating the lines 44, 46, 108 and 110 drives the resolver 82. A casing 344 may be provided to cover the apparatus that is mounted upon the upper surface of the plate 324, an opening being provided in the casing 344 to expose an output plug block 346. Attached to the lower surface of the plate 324 is a similar plate 348 which in turn supports on its under surface a second set of components similar to those mounted on the upper surface of plate 324. The components on the under surface of plate 348 may be covered by a casing 350, leaving exposed an output plug block 352. Upon the upper surface of the plate 348 may be mounted three mutually perpendicular accelerometers 354, 356, 358, for sensing accelerations about three mutually perpendicular axes of reference relative to the space platform.

The coiled delay lines in the casing 350 are made rotatable on a shaft 360 that is parallel to the plates 324, 348 but is perpendicular to the shaft 32.

It will usually be desirable to align the shaft 314 with the fore-and-aft line of the vehicle.

Using a single turn of coaxial cable for each sensing coil, and using solid state components for the oscillators, amplifiers, integrators, etc., the arrangement shown in FIG. 3 may be accommodated in a space about five and a half inches in diameter and about six and a half inches in height, an may weigh not over about five pounds. Sufficiently high frequency waves may be developed in the single turns of the sensing coils so that the number of wavelengths in each coil will be large, say one hundred or more and the equivalent of a large number of turns may be obtained.

In accordance with known practice in the art of gyroscope mounting and utilization, a resolver may be actuated by the shaft 28 so that when the gimbals are in certain extreme positions, the information sensed by the delay lines may be fed to the proper drive motor to correct the position of the platform. It is known that the sensing elements which normally sense azimuth and pitch, for example, may at times assume attitudes wherein they sense azimuth and roll, or pitch and roll, or other undesired combinations. In a three-axis device, a resolver on the X-axis with conventional circuits will assure that whatever quantity is being sensed by a given sensing element, the sensed information will be transmitted in proper form to the appropriate motor for correcting the attitude of the space platform or for storing the correct information in a computer. Also in accordance with known practice, a fourth gimbal may be added to the supporting system in order to avoid gimbal lock.

In applications where a space platform is not required, for example in navigational systems wherein a digital computer is employed for resolving detected rotations with respect to a reference system of mutually perpendicular axes, the gimbal mounting system may be entirely dispensed with and the supports 326, 328, for the shaft 32 and lines 44, 46, 108, and 110, may then be mounted directly upon any rigid portion of the vehicle. The second similar assembly carrying the four other lines may also be similar mounted, with the second shaft 360 at right angles to the shaft 32. An arrangement of this type is shown schematically in FIG. 4.

In FIG. 4, there is shown a block 45 to represent a relativistic oscillator comprising the delay line 44, and amplifier 48 as shown in FIG. 1. Other blocks 47, 109, 111, similarly represent respectively the combination of line 46 and amplifier 50, the combination of line 108 and amplifier 112, and the combination of line 110 and amplifier 114. As in FIG. 1, the shaft 32 may be driven by the motor 38 with power from oscillator 94. The respective output connections from the oscillating line assemblies are shown at 51, 61, 151, 161, as in FIG. 1.

To achieve phase multiplication, in a different way from that shown in FIG. 1, the waves in the connections 51, 61, 151, 161, are passed through a succession of mixers, intermediate frequency amplifiers, and frequency multipliers before the resulting waves are impressed upon the sum and difference circuits. Circuits are shown in block form for connections 51 and 61. A similar set of circuits are required for connections 151 and 161 but these latter circuits are omitted from the drawing for the sake of clarity. The sum circuit 71 and the difference circuit 69 are shown in the figure. It is understood that the circuits for the connections 151, 161, include another sum circuit and another difference circuit similar to the respective circuits 71, 69. The connections 51, 61 go to mixers 400 and 402, respectively, served in common by a carrier oscillator 403. The output waves from the mixers are given intermediate frequency amplification in intermediate frequency amplifiers 404 and 406, respectively. The output waves from the amplifiers 404, 406, are subjected to frequency multiplication in frequency multipliers 408 and 410, respectively. The frequency multiplied waves are again translated to intermediate frequency in mixers 412 and 414, respectively, which mixers may be supplied with carrier waves from the source 403. Additional intermediate frequency amplification is provided in intermediate frequency amplifiers 416 and 418, followed by a second frequency multiplication in frequency multipliers 420 and 422. The frequency multiplied waves from these multipliers are impressed both upon the sum circuit 71 and the difference circuit 69. As in the circuit of FIG. 1, the sum wave from circuit 71 is impressed upon the 90° phase shifter 74 to generate a reference wave of the proper phase to function in the phase demodulator 76. The output wave from the difference circuit 69 is phase demodulated in the demodulator 76 to obtain a signal wave which actuates a computing device such as a digital computer counter 424. The phase multiplication may be carried to such an extent that a number of complete cycles are generated, thereby actuating the counter once per cycle.

Also, as in the circuit of FIG. 1, the sum wave is impressed upon the differentiator 98 from which connections go in tandem relationship to the phase demodulator 100, integrator 102, phase inverter 103, and reactance circuit 104, the output wave from the latter being impressed upon the line assembly 45 over the connection 51. Reference carrier for the phase demodulator 100 is supplied as before by the phase shifter 74.

An additional phase demodulator 426 is provided which is fed with a wave from the output of the intermediate frequency amplifier 418 and a reference carrier wave from phase shifter 74. The output wave from the demodulator 426 is impressed upon the digital computer counter 424 along with the phase demodulated wave from the demodulator 76. The polarity of the output of the phase demodulator 426 determines whether the pulses are to be added or subtracted.

The counter 424 counts units of phase change due to rotation of the oscillating lines. The units of phase change occur at varying rates depending upon the angular rate of rotation of the oscillating lines about their sensitive axis.

The frequency of the local oscillator 403 may be suitably controlled within close limits to a constant value by connecting a conventional automatic frequency control circuit 430 between the output of one of the mixers, for example mixer 400, and a suitable control element in the oscillator.

In the arrangement of FIG. 4, a single transmission loop wave sustaining device of type illustrated in FIGS. 7–12 may be substituted for each pair of delay line oscillators such as represented by any one of the blocks 45, 47, 109 and 111. In this case, sum and difference waves from such a single loop device may be separately amplified as desired, whereupon the amplified sum wave may be impressed upon the phase shifter 74 and the differenciater 98 while the amplified difference wave may be impressed upon the phase detector 76.

In known manner, the counter 424 accumulates data in digital form as received from the phase demodulators 76 and 426 which is used by a digital computer in conjunction with time signals and other data to record the maneuvers of the vehicle and to generate control signals for the navigation and control of the vehicle in known manner.

FIG. 5 shows a rotation responsive device which uses electromagnetic waves at optical frequencies. In this case, energy from a single source is transmitted into opposite ends of a coiled optical transmission line. A phase comparison is made upon two beams of light which have traversed the line in opposite directions. Advantage is taken of the very short wavelength of the light waves to improve the sensitivity of the device.

A monochromatic light source is shown at 500, sending a beam of light through a lens 502 to a partially silvered mirror 504. The mirror 504 divides the beam into two nearly equal beams, one transmitted and the other reflected. The transmitted beam is shown passing through a Kerr phase shifting cell 506 to a coiled quartz fiber 508. The transmitted beam traverses the fiber in counterclockwise direction, emerging at the far end where it strikes the mirror 504 and is partially transmitted through the mirror to a lens 510 and thence through a slit in a diaphragm 512 to a photomultiplier tube 514. The original reflected beam from the mirror 504 is directed to the opposite end of the fiber 508 and traverses the fiber in clockwise direction. Upon emerging from the fiber, the beam passes through the cell 506, is reflected at the mirror 504, and passes through the lens 510 and diaphragm 512 to the photomultiplier tube 514. The apparatus described up to this point is mounted upon a platform 515 that is rotatable by a shaft 516 which may be driven by a motor 518 and gear train 520.

The electrical output wave from the photomultiplier tube 514 is amplified in an amplifier 522, phase demodulated in a phase demodulator 524, and filtered in a filter 526. The filtered wave is passed through an integrator 528, the output of which controls a servo amplifier 530, which in turn controls the motor 518 to rotate the shaft 516 in such manner as to counteract any tendency of the platform 515 to rotate in respect to inertial space.

Instead of using the quartz fiber 508 or the like as a transmission line for the light beam, the beam may be guided in a polygonal path by means of a succession of reflective surfaces in known manner.

The Kerr cell 506 may be phase modulated by a wave from an oscillator 532. To offset this modulation, a reference wave is supplied to the phase demodulator 524 from the oscillator 532 after multiplication in a frequency multiplier 534.

The Kerr cell 506 constitutes a phase shifter for light waves and is controllable as to the magnitude of the phase shift by means of a variable voltage impressed upon plate electrodes in the cell. It is used as a phase modulator to introduce a periodic phase variation into the light beams.

The plate electrodes in the Kerr cell and the connections of the electrodes to the oscillator 532 are shown diagrammatically in FIG. 5-A. Four spaced plate electrodes are shown, of which two, plates 540 and 542, may be horizontally mounted, and two others, plates 544 and 546, may be vertically mounted, bounding four sides of a central space in which the light beam is accommodated. The space between the plates is filled with a suitable doubly refractive medium such as benzene. The cell may be enclosed in a container 548 of quartz. One horizontal plate and one vertical plate may be connected together, for example plates 540 and 544, and the two connected to one output terminal of the oscillator 532. The other two plates 542 and 546 are connected to each other and to the second output terminal of the oscillator 532. The four plate arrangement permits the plane of polarization of the light entering the cell to have random inclination and still receive the desired phase shift in passing through the cell, which would not be possible using only two plates.

The purpose of modulating the light beam in the Kerr cell or other device of similar effect is to introduce into the signals a periodic variation which is extremely unlikely to be duplicated in the signal variations which are caused by drifting characteristics of components. This purpose is similar to that of the rotation of the sensing coils in the system of FIGS. 1 and 1–A, which introduces a similar periodic variation into the signals.

To accommodate either unpolarized light or polarized light of various polarities, two Kerr cells in tandem may be used, with the electromagnetic fields of the two cells oriented perpendicular to each other, or a single cell with two orthogonal fields may be used as shown.

One light beam, reflected at the partially silvered mirror surface, passes first through the Kerr cell and then makes a circuit of the light transmitting fiber. The other light beam, transmitted through the partially silvered mirror surface, makes a circuit of the fiber and then passes through the Kerr cell. Thus the two beams receive their respective phase modulations at different times. The phase modulated beams are combined in phase opposition in the photomultiplier tube 514. It is desired that the phase modulations impressed by the Kerr cell upon the respective beams shall not annul each other in the photomultiplier tube. This annullment may be avoided and the phase modulations brought into phase agreement by suitably selecting the frequency of the modulating wave which is used to modulate the Kerr cell to be such a frequency that corresponding portions of the two beams pass through the Kerr cell at times when the modulating wave is in the same phase. It is found that phase agreement is obtained when the time difference between the arrivals of the two beams at the Kerr cell is a quarter cycle, that is 90 degrees, of the frequency at which the field is in the Kerr cell is varied. With this arrangement, the first beam to traverse the Kerr cell is phase modulated in a given phase and after the second beam has made the circuit of the quartz fiber the second beam arrives at the Kerr cell at the proper instant to be phase modulated in an appropriate phase so that when the first and second beams are combined in the photomultiplier tube the two beams carry phase modulations which are in phase with each other.

Expressions for the light collected at the photomultiplier may be set down as follows for the beam in one path $$e_1 = A \sin [\omega_1 t + \theta + 180° + \Delta_0 \sin^2(\omega_2 t + \phi)]$$

and for the other path.

$$e_2 = A \sin [\omega_1 t - \theta + \Delta_0 \sin \omega_2 t]$$

where $A$ is the amplitude of the light, $\omega_1$ is the frequency of the light in radians per second, $\theta$ is the extra phase shift due to rotation of the system, 180° is the phase shift introduced into the system by known methods in order to obtain a null condition. $\Delta_0$ is the amplitude of the phase modulation introduced by the Kerr cell. $\omega_2$ is the angular frequency of the Kerr cell modulation, and $\phi$ represents the phase shift due to the time difference between the arrivals of the respective beams at the Kerr cell. The angle $\phi$ may also be described as the phase shift required to give the correct polarity to the Kerr cell modulation to cancel out the erroneous effect that would otherwise arise due to both directions of light passing through the single cell.

The factor $\Delta_0$ is given by $$\frac{jL\lambda E_0^2}{d^2}$$

Where $j$ is the Kerr constant, $0.6 \times 10^{-7}$ for benzene, L is the length of the electrodes, in centimeters, $E_0$ is the maximum potential difference in electrostatic units between the electrodes, $\lambda$ is the wavelength in the medium, and $d$ is the separation of the electrode plates in centimeters. The modulating signal is $$E = E_0 \sin (\omega_2 t + \phi)$$

If $\phi$ is 90°, $$\Delta_0 \sin^2(\omega_2 t + \phi) = \Delta_0(\tfrac{1}{2} + \tfrac{1}{2} \cos 2\omega_2 t)$$

and if $\varphi$ is zero, $$\Delta_0 \sin^2(\omega_2 t + \phi) = \Delta_0(\tfrac{1}{2} - \tfrac{1}{2} \cos 2\omega_2 t)$$

Using the value for $\phi$ of 90° in $e_1$ and zero in $e_2$, $$e_1 = A \sin \left(\omega_1 t + \theta + 180° + \frac{\Delta_0}{2} + \frac{\Delta_0}{2} \cos 2\omega_2 t\right)$$

$$e_2 = A \sin \left(\omega_1 t - \theta + \frac{\Delta_0}{2} - \frac{\Delta_0}{2} \cos 2\omega_2 t\right)$$

The photomultiplier tube responds to the energy in the sum of $e_1$ and $e_2$, or the square of $e_1$ plus $e_2$. After filtering, the components remaining are $$\frac{A^2}{2} + \frac{A^2}{2} - A^2 \cos(2\theta + \Delta_0 \cos 2\omega_2 t)$$

$$= A^2[1 - \cos(2\theta + \Delta_0 \cos 2\omega_2 t)]$$

$$= 2A^2 \sin^2 \left(\theta + \frac{\Delta_0}{2} \cos 2\omega_2 t\right)$$

Since $$\left(\theta + \frac{\Delta_0}{2} \cos 2\omega_2 t\right)$$

is a very small angle, the preceding reduces to $$2A^2 \left(\theta + \frac{\Delta_0}{2} \cos 2\omega_2 t\right)^2$$

which is readily expanded to $$2A^2 \left(\theta^2 + \frac{\Delta_0^2}{8} + \frac{\Delta_0^2}{8} \cos 4\omega_2 t + \theta\Delta_0 \cos 2\omega_2 t\right)$$

Using the preceding as a signal in a phase demodulator with a reference carrier wave of $2 \cos 2\omega_2 t$ gives an output of $2A^2\Delta_0\theta$, after filtering out the higher order terms. The reference carrier is readily obtained by multiplying the frequency of the oscillator 532 by two in the frequency multiplier 534.

To compute the value of the frequency $\omega_2$ required in order that $\phi$ may have the value of 90 degrees, the following calculations are performed.

To compute the necessary frequency, it should be noted that a wave going down a line of length L through material having index of refraction $n$ is propagated at the speed of $C/n$ and requires $nL/C$ seconds to make the trip. If this time is a quarter of a cycle, the time of a full cycle is $4nL/C$ and the corresponding frequency is $C/4nL$. In an illustrative case where the line is 1000 feet of quartz fiber which has an index of refraction of 1.55, the frequency required is $$\frac{0.98 \times 10^9}{4 \times 1.55 \times 10^3} = 1.58 \times 10^5 \text{ cycles per second}$$

The result will be modified slightly if the path length varies due to variations in the angle at which the light is reflected from side to side of the quartz fiber as the light is propagated along the fiber. It will be noted that the more exact value of C of $0.98 \times 10^9$ is used in this calculation in place of the approximation $10^9$ used elsewhere herein.

FIG. 6 shows an arrangement of prisms which may be substituted for the partially silvered mirror 504 of FIG. 5. The prisms are shown in right-sectional diagrammatical form at 600 and 602 respectively. Each prism is pentagonal in section, the two pentagons being equal but not regular. The prisms are placed in optical contact with each other along one similar face. The prisms are one inverted with respect to the other so that there is a skew symmetry between the respective sections, as shown. One or both of the surfaces in contact is partially silvered and is placed in the same relationship to the respective ends of the fiber 508 as a partially silvered surface 504 shown in FIG. 5. In FIG. 6, this partially silvered surface is shown at 604.

A ray from the source 500 enters the fiber 508 at fiber end 601 over a path in which it is reflected at the surface 604 and again at a silvered surface 606. This ray, emerging from fiber end 603 enters the photomultiplier tube 514 over a path in which it is reflected at the surface 604 and again at a silvered surface 608. A ray from the source 500 enters the fiber 508 at fiber end 603 over a path that goes directly through the partially silvered surface 604. This ray, emerging from fiber end 601 enters the photomultiplier 514 over a path in which it is reflected at the silvered surface 606, goes directly through the partially silvered surface 604, and is reflected at the silvered surface 608.

The arrangement shown will accommodate a wide band of rays following substantially parallel paths, parallel respectively to the paths traced in detail above, all these parallel paths being substantially equal in length.

A diaphragm 610 is inserted between the Kerr cell 506 and the prism 602 to adjust the intensity of the beam that emerges from the fiber end 603 with respect to the intensity of the beam which emerges from the fiber end 601, as a means of adjusting the two beams to equal intensity in order to secure a high degree of nulling of the two beams in the photomultiplier tube 514. Owing to the fact that the shapes of the beams passing through the diaphragm 610 in the two directions are different, this diaphragm may be made to have greater controlling effect upon the beam from the fiber end 603 than upon the beam from the fiber end 603 than upon the beam entering the diaphragm from prism 602.

The arrangement of FIG. 6 is advantageous over a partially silvered mirror alone as shown in FIG. 5 in that the arrangement of FIG. 6 is insentitive to small deviations of the partially silvered surface 604 from its initially set position. When the prism assembly is rotated slightly about its normal position, the angle between a ray leaving the lens 502 and the ray entering the fiber 508 at fiber end 601 remains unchanged. Likewise unchanged is the angle between a ray leaving the fiber end 603 and the ray entering the photomultiplier 514. Furthermore, the direction of the ray that passes through the partially silvered surface 604 is unchanged by this rotation of the prism assembly.

It should be noted that the loop transmission circuits need not be circular as illustrated in certain of the figures, nor polygonal as in Sagnac's experiment, but it is essential that the loop enclose an area or bound a surface which will have as large a projection as possible upon the plane in which the rotation takes place. Otherwise stated, there should be as large a projection as possible upon the plane that is normal to the axis of the rotation.

Preliminary adjustment should be made to secure as near as possible a null of phase difference or frequency difference in the system in the absence of rotation to which the system is expected to respond. Such an initial adjustment may if desired, compensate, among other things, for the rotation of the earth, the value of which being 15 degrees per hour is evidently very large compared with the desired maximum drift value of $10^{-5}$ degrees per hour. The sensitivity of the system to small variations in the net rotation of the system will not be appreciably affected by constant rotations, even though relatively large, provided the constant rotations are included in the initial compensation of the system, or are otherwise offset in known manner, similarly to practices employing gyroscopes.

Among suitable sources of electromagnetic waves for devices of the type herein described, are those which produce preferably coherent radiation, that is, strictly a single frequency at a constant phase. There are sources of this kind available which are actuated by stimulated emission of radiation and are commonly known as "masers" and "lasers." The masers serve as sources and amplifiers of microwaves, while the lasers serve as sources and amplifiers of light.

For descriptions of techniques that are available for use in compensating for impedance irregularities and for eliminating undesired reflections in transmission lines reference may be made to the published art, including in particular, a book entitled "Crossed Field Microwave Devices," vol. 2, edited by E. Okress, published in 1961 by Academic Press, especially the material on phasing by radio frequency signals beginning on page 375.

Information concerning components of the types shown in block form in the drawings herein is available in the litertaure and their properties are known to those skilled in the art. Among numerous handbooks treating such components may be mentioned Electronic Designers' Handbook," McGraw-Hill Book Co., 1957, and "Handbook of Automation, Computation and Control," John Wiley and Sons, 1958.

While illustrative forms of apparatus and methods in accordance with the invention have been described and shown herein, it will be understood that numerous changes may be made without departing from the general principles and scope of the invention.

I claim:

1. In an inertial reference device, in combination, means to transmit a wave, a closed wave-transmission path for causing the energy of the transmitted wave to travel past the same part of said path more than once, phase-sensitive means connected to said path to detect angular motion thereof, and means to digitize such detected angular motion.

2. In an inertial reference device, in combination, means to transmit a wave, a closed wave-transmission path for causing the energy of the transmitted wave to travel past the same part of said path more than once, and analogue means sensitive to a phase change in said path responsive to angular motion of said path.

3. In an inertial reference device, in combination, means to transmit a wave, a closed wave-transmission path for causing the energy of the transmitted wave to travel past the same part of said path more than once, means actuated by waves in said path to detect rotation of said path, and means actuated by said rotation detecting means to impart a counter-rotation to said path.

4. In an inertial reference device, in combination, an inertial platform, means to transmit a wave, a closed wave-transmission path for causing the energy of the transmitted wave to travel past the same part of said path more than once, said path being mounted upon said platform, means sensitive to changes in wave phase in said path to detect rotation of said platform, and means actuated by said phase-sensitive means to impart counter-rotation to said platform to offset the detected rotation thereof.

5. In an inertial reference device, in combination, an inertial platform, means to transmit waves, three closed wave-transmission paths for causing the energy of the transmitted wave in each said path to travel past the same part of the respective path more than once, said paths being mounted upon said platform each in operative relationship to a different one of three mutually perpendicular reference axes, means individual to each of said transmission paths and sensitive to phase changes of waves in the respective path to detect angular motion of said platform about the respective reference axis, and means actuated by said phase-sensitive means to maintain a stable attitude of said platform.

6. In an inertial reference device, in combination, means to transmit a wave, a closed wave-transmission path for causing the energy of the transmitted wave to travel past the same part of said path more than once, phase-sensitive means connected to said path to detect angular motion thereof, phase multiplying means connected to the output of said phase-sensitive means to multiply the phase change developed thereby, and cycle-counting means actuated by said phase-multiplying means for digitalizing said phase change.

7. In an inertial reference device, in combination, a plurality of resistance elements connected together in the form of a Wheatstone bridge, said resistance elements being arranged in an open loop formation enclosing an area having a projection normal to a given axis of rotation, at least one of said resistance elements being connected to be traversed by current in opposite direction to a diagonally opposite element with respect to said axis of revolution, said loop being rotatable about said axis of rotation thereby altering the condition of balance of the bridge, due to a relativistic effect, means to detect a change in the said condition of balance, and means actuated by said change detecting means, for imparting a counter-rotation to said loop.

8. Apparatus according to claim 7, together with means to rotate said loop about a second axis perpendicular to said given axis to introduce an additional modulation effect in said bridge, and means to demodulate the output current from the bridge to remove said additional modulation.

9. The method of detecting rotation of a rotatable structure, which method comprises the steps of setting up a pair of traveling waves of substantially equal frequency upon said structure, the respective waves in said pair traveling in opposite directions, one traveling in the same direction as the rotation to be detected, and the other wave traveling in the opposite direction, detecting a phase difference between said waves upon rotation of said structure, and integrating said phase difference over a period of at least several cycles of said waves.

10. The method of detecting rotation of a rotatable closed wave-transmission path structure, which method comprises the steps of setting up a pair of self-oscillating wave systems of substantially equal frequency upon said structure, the respective waves in said pair traveling in opposite directions, one traveling in the same direction as the rotaton to be detected, and the other traveling in the opposite direction, causing the energy of each of the transmitted waves in said path to travel past the same part of said path more than once, and comparing the instantaneous phases of the waves in said systems.

11. The method of detecting rotation of a rotatable closed wave-transmission path structure, which method comprises the steps of setting up a standing wave pattern in a said path causing the energy of the transmitted waves comprising said standing wave pattern to travel past the same part of said path more than once, detecting a nodal point in said standing wave pattern, and detecting a shift in said nodal point from the original location thereof in said path.

12. In a rotation responsive device, in combination means to transmit a wave, a closed wave-transmission path for causing the energy of the transmitted wave to travel past the same part of said path more than once, said path being so disposed as to be subject to at least a component of rotation about a given axis of rotation, means to maintain self-sustained oscillations in said path, and means to detect phase changes at a given point in said path, whereby rotation of said path relative to said axis of rotation may be detected.

13. In a rotation responsive device, in combination, a wave transmission loop, said loop being so disposed as to be subject to at least a component of rotation about a given axis of rotation, means to maintain self-sustained oscillations in said loop, and means to detect phase changes at a given point in said loop, whereby rotation of said loop relative to said axis of rotation may be detected, together with means to rotate said loop about an axis perpendicular to said given axis of rotation, whereby phase changes due to rotation of the loop about said first mentioned axis of rotation may be distinguished from phase changes which are independent of said rotation.

14. Apparatus according to claim 12, in which the said transmission path is adapted for transmitting electromagnetic waves and the said means to maintain self-sustained oscillations is adapted to maintain electromagnetic oscillations.

15. In a rotation responsive device, in combination, means to transmit waves, a pair of self-oscillatory closed wave-transmission paths for causing the energy of the transmitted waves to travel past the same part of the respective path more than once, said paths lying substantially in a plane and subject to a rotation about an axis having at least a component perpendicular to said plane whereby rotation of said paths about said axis produces a phase shift between the respective waves in said paths, means to combine waves from the respective paths of said pair in approximately opposing phase to obtain a relatively highly nulled difference wave of amplitude relatively small compared to the amplitude of either wave so combined, means to regulate the degree of nulling of said waves so combined in order to introduce into said difference wave a phase shift relative to the phase of either of the waves so combined which phase shift is large compared to the phase shift introduced between the waves in said path by relativistic effect of rotation of said paths about said axis of rotation, and means to phase demodulate said difference wave in order to detect said relatively large phase shift.

16. In a rotation responsive relativistic device, in combination, means to transmit waves, a pair of self-oscillatory closed wave-transmission paths for causing the energy of the transmitted waves to travel past the same part of the respective path more than once, said paths being arranged to be subjected to a rotation whereby a progressive phase shift is produced between waves in the respective paths, means to combine waves from the respective paths of said pair in approximately opposing phase to obtain a relatively highly nulled difference wave of amplitude relatively small compared to the amplitude of either wave so combined, a phase demodulator, means to impress said difference wave upon the input of said phase demodulator over a period of time while said phase shift becomes progressively larger, and means to rotate said paths in a sense opposite to the rotation which produces said phase shift to reduce the net amount of rotation, said last mentioned rotating means being actuated by the output from said phase demodulator, thereby reducing the net amount of rotation and at the same time reducing the rate of increase of the said progressive phase shift.

17. Apparatus according to claim 16, together with means inserted between the output of said phase demodulator and the input of said rotating means for integrating the output of said phase demodulator over said period of time while said phase shift becomes progressively larger.

18. In a rotation responsive device, in combination, means to transmit a wave, a closed wave-transmission path for causing the energy of the transmitted wave to travel past the same part of said path more than once, said path being so disposed as to be subject to at least a component of rotation about a given axis of rotation, means to impress oscillations upon said path to detect phase changes at a given point in said path and means responsive to detected phase changes to rotate said path about said given axis of rotation in opposition to the rotation to which said path is subject, whereby rotation of said path about said axis is reduced or substantially prevented.

19. Apparatus according to claim 18, in which the said transmission path is adapted for transmitting electromagnetic waves and the said means to impress oscillations upon said path is adapted to impress electromagnetic waves thereon.

20. Apparatus according to claim 18, in which the said transmission path is adapted to transmit a beam of light and the said means to impress oscillations upon said path is adapted to impress a beam of light thereon.

21. In a rotation responsive device, in combination, a transmission loop for waves, four amplifiers connected to said loop at points in said loop spaced apart by an odd number of quarter wavelengths, whereby a standing wave pattern is set up in said loop, and means to detect a shift in the location of said standing wave pattern relative to said loop.

22. In rotation responsive apparatus, in combination, means to generate a pair of waves differently affected by rotation of their respective transmission paths, means to additively combine said waves to generate a sum wave therefrom, means to impart a 90 degree phase shift to a portion of said sum wave, means to differentially combine said waves to generate a difference wave therefrom, said difference wave containing a phase modulation due to said rotation, means to differentiate said sum wave, phase demodulating means for combining with said differentiated sum wave said 90 degree phase shifted sum wave as a reference carrier to generate a periodic wave representative of an undesired phase modulation in said differently affected original waves, means to integrate said periodic wave representative of the undesired phase modulation, means to invert the phase of said integrated wave, and means to superpose said phase inverted wave upon said differently affected original waves, whereby said undesired phase modulation is substantially offset, while leaving substantially unaffected said phase modulation due to said rotation.

23. In rotation responsive apparatus, in combination, means to generate a pair of waves differently affected by rotation of their respective transmission paths, means to additively combine said waves to generate a sum wave therefrom, means to differentially combine said waves to generate a difference wave therefrom, said difference wave containing a phase modulation due to said rotation, means including a reference carrier wave to superpose upon said original waves an additional predetermined phase modulation, means including a square law detector for performing a detection operation upon said difference wave, phase demodulating means for combining said detected wave with said reference carrier wave, whereby there is obtained a detected wave that is proportional in amplitude to said reference carrier wave, thereby effecting an amplification of the response of the apparatus to the said phase modulation due to the said rotation.

24. Apparatus for phase multiplication comprising, in combination, means to introduce into each of two waves to be phase compared a perodic phase variation in addition to the phase difference to be multiplied, means to combine said waves so phase varied to obtain a null wave of substantially the same original frequency as said waves and of amplitude proportional to the said phase difference, a square law detector, means for impressing said null wave upon said square law detector, means to filter out of the output from the square law detector components of frequency higher than the frequency of said original waves, a source of reference carrier waves of the frequency of said periodic phase variation, a phase demodulator, and means to impress the filtered output from said square law detector upon said phase demodulator along with a wave from said source of reference carrier waves, whereby an output is obtained which is proportional to the phase difference and proportional to the amplitude of the reference carrier waves, thereby multiplying the phase difference by a factor determined by the amplitude of the reference carrier waves.

25. A beam splitting device comprising, in combination, a pair of substantially identical non-regular pentagonal optical prisms in optical contact with each other along one similar face, one prism being inverted with respect to the other in a skew-symmetrical arrangement, at least one of said faces in optical contact with each other being partially reflecting and partially transmitting for a light beam, and a pair of parallel similar faces of the respective prisms being substantially completely reflective.

26. Apparatus for synchronizing a pair of oscillators, comprising in combination, means to combine waves from said oscillators in adding phase relation to generate sum waves, a 90 degree phase shifter, means to impress sum waves upon said phase shifter to generate a reference carrier wave, wave differentiating means, means to impress sum waves upon said differentiating means, a phase demodulator, means to impress differentiated sum waves along with said reference carrier wave upon said phase demodulator to generate a phase demodulated wave, means to integrate said phase demodulated wave, a variable reactance circuit connected to at least one of said oscillators to vary the phase thereof, and means to impress said integrated wave upon said variable reactance circuit, whereby phase differences between said oscillators are reduced or substantially eliminated.

27. A standing wave generator comprising, in combination, a continuous circular transmission line, a plurality of substantially identical negative resistance elements connected to said line at equally spaced intervals, said plurality comprising a multiple of four such elements, means to adjust the conductances of the said negative resistance elements to substantial equality, whereby reflected waves due to conductance inequalities may be substantially eliminated, and a plurality of tuning stubs connected to said line at positions substantially equidistant from a pair of adjacent negative resistance elements, whereby reflected waves due to reactance irregularities of the line may be substantially eliminated.

28. In a rotation responsive device, in combination, means to generate a pair of waves, rotation responsive means to set up a phase difference between said waves representative of a given rotation, means for impressing an added arbitrary phase modulation upon said phase difference, means to combine said phase distinguished waves in opposing relation to generate a difference wave carrying both the said rotation responsive phase difference and the said arbitrary phase modulation, means to combine said phase distinguished waves in phase aiding relation to generate a sum wave, means to introduce 90 degree phase shift into said sum wave to form a first reference carrier wave, a first phase demodulator, means to impress upon said first phase demodulator said difference wave and said first reference carrier wave to generate a first detected wave representing the said rotation responsive phase difference and carrying the said arbitrary phase modulation, a source of a second reference carrier wave representative of said arbitrary phase modulation, a second phase demodulator, means to impress upon said second phase demodulator said first detected wave and said second reference carrier wave to generate a second detected wave representative of said rotation responsive phase difference and substantially free of said arbitrary phase modulation, and means to utilize said second detected wave.

29. In a standing wave generator, in combination, a closed loop transmission line, an auxiliary transmission line paralleling said loop line and coupled thereto along the length of said auxiliary line, said auxiliary line being terminated substantially non-reflectively at both ends, means positioned substantially midway between the ends of said auxiliary line for sustaining traveling waves in said auxiliary line, said waves traveling in both directions from the position of said wave sustaining means, whereby the said coupling between said loop line and said auxiliary line is made substantially uni-directional so that a wave traveling in one direction is induced in said loop line from the portion of the auxiliary line on one side of said position of the wave sustaining means and a traveling wave in the opposite direction is induced in said loop line from the remaining portion of the auxiliary line, thereby setting up a standing wave pattern in said loop line.

30. In a standing wave generator, in combination, means to transmit waves, a closed wave-transmission path for causing the energy of the transmitted waves to travel past the same part of said path more than once, at least two means for sustaining traveling waves in said path, first coupling means for connecting a first of said wave sustaining means to a first point in said path, second coupling means for connecting a second of said wave sustaining means to a second point in said path critically spaced from said first point, whereby said first wave sustaining means induces a wave traveling in one direction only in said path and said second wave sustaining means simultaneously induces a wave traveling in the reverse direction only in said path, thereby setting up a standing wave pattern in said path.

31. In a two-axis inertial reference device, in combination, an inertial platform, means to transmit waves, two closed wave-transmission paths for causing the energy of the transmitted waves to travel past the same part of the respective path more than once, said paths being mounted upon said platform, said paths being mounted with a common diameter and rotatable about said common diameter, means individual to each of said transmission paths and sensitive to phase changes of waves in the respective path to detect angular motion of said platform about one of two mutually perpendicular reference axes, and means actuated by rotation of said path to resolve detected angular motions with respect to their components along each of said reference axes.

32. In a two-axis rotation responsive device, in combination, a pair of wave transmission loops mounted substantially perpendicularly to each other upon a common axis of rotation, means to rotate said loops about said common axis, means to establish self-sustained oscillations in each of said loops, means to detect phase changes at a given point in each said loop, whereby components of rotation about two mutually perpendicular reference axes may be detected and means to resolve the said components of rotation with respect to said axes, said reference axes being each perpendicular to said common axis of said loops, whereby phase changes due to rotations of loops about either of said reference axes are phase modulated at the rate of rotation of said loops about said common axis of said loops, thereby distinguishing said phase changes from phase changes which are not affected by the rotation of the transmission loops about said common axis.

33. In an inertial reference device, in combination, a loop transmission path including a delay line, means to impress a pair of waves upon said loop, said waves traveling in opposite directions, means to compare the phases of the resultant oscillations at two given points in said loop, means to adjust said phases to obtain a substantial null phase difference between said phases, whereby rotation of said loop produces a relativistic effect which unbalances said phases, thereby giving an indication of said rotation in the form of a non-null response from said phase comparing means.

34. Apparatus according to claim 33, in which said delay line has an effective length of at least several complete wavelengths of the waves impressed thereon.

35. Apparatus according to claim 33, in which the said phase comparing means passes a portion of the impressed wave in an amount commensurate with the amount of phase difference between said given points in the loop, and superheterodyne receiving means connected to the output of said phase comparing means for detecting the said portion of the impressed wave so passed by the said phase comparing means, whereby a relativistic effect due to a rotation of said loop is indicated by a response in said superheterodyne receiver.

36. The method of adjusting a standing wave pattern in a continuous loop transmission line provided with wave reflection annulling devices, which method comprises vibrating said line in angular displacement while adjusting said reflection annulling devices and at the same time detecting phase variations of the waves at a null point in the said standing wave pattern in said loop produced by the relativistic effect of the vibrations, whereby a maximum of detected phase variation indicates a minimum of wave reflections that interfere with the degree of nulling at said null point.

37. In a test circuit for adjusting a standing wave pattern in a continuous loop transmission line, at least one reflection annulling device connected to said line, means to vibrate said line in angular displacement in the plane of the loop, and means to detect a phase change in said standing wave pattern due to a relativistic effect generated by vibratory angular displacement of said line.

38. Apparatus for maintaining two oscillating circuits at substantially equal amplitudes, comprising, in combination, means to sum the waves from said oscillators to form a sum wave, means to oppose the waves from said oscillators to form a difference wave, a phase demodulator, means to impress said difference wave upon said phase demodulator as a signal input wave, means to impress said sum wave upon said phase demodulator as a phase reference wave, amplitude control means for one of said oscillating circuits, and means to impress a phase demodulated output component from said phase demodulator upon said amplitude control means in proper polarity to reduce any departure from the desired substantially equal amplitudes.

39. An inertial reference device comprising, in combination, a loop transmission line, means to set up a standing wave pattern in said loop line, means to maintain said loop line in a cryogenic environment whereby said standing wave pattern persists after disconnection of said means for setting up the pattern, and means to detect an angular displacement of said standing wave pattern relatively to said loop line.

40. An inertial reference device comprising, in combination,
 (a) means to transmit waves,
 (b) a pair of closed wave-transmission paths for causing the energy of the transmitted wave to travel past the same part of the respective path more than once,
 (c) means to maintain a pair of waves in said wave paths wherein the respective waves are unequally affected by a given angular motion of said paths,
 (d) phase demodulating means,
 (e) means to impress upon said phase demodulating means a first input wave repersenting the difference between said waves when said waves are combined in substantial phase opposition, said input wave bearing a phase modulation due to said angular motion,
 (f) means to impress upon said phase demodulating means a second input wave which constitutes a reference wave, whereby said phase demodulating means develops a signal wave representative of said phase modulation, and
 (g) means to determine the sense of the said angular motion from the said signal wave.

41. Apparatus according to claim 40, in which said paths are substantially coincident, forming a single common wave path, and in which said first mentioned pair of waves travel in opposite directions around said common wave path, combining directly therein to form a wave pattern.

42. Apparatus according to claim 40, in which said reference wave represents the sum of said first mentioned waves when said waves are combined in substantial phase coincidence; together with phase shifting means for adjusting the phase of said reference wave to a suitable value for effecting the desired phase demodulation before the said reference wave is impressed upon said phase demodulator.

43. Apparatus according to claim 41, together with means to differentiate said sum representative wave, a second phase demodulating means for combining the differentiated wave with the said reference wave to generate a periodic wave representative of an undesired phase modulation unavoidably present in said difference wave, means to integrate said periodic wave representative of said undesired phase modulation, means to invert the phase of said integrated wave, and means to superpose said phase inverted wave upon said wave paths, whereby said undesired phase modulation is substantially offset, while leaving substantially unaffected the phase variations due to angular motion.

44. Apparatus according to claim 41, together with means for impressing an arbitrary added phase modulation upon said waves independently of any phase variation due to said angular motion, wherein the said phase demodulating means generates a first detected wave representing said phase modulation due to said angular motion and carrying the said arbitrary phase modulation, a source of a second reference wave suitable for phase demodulating said arbitrary phase modulation, and a second phase demodulator upon which is impressed said first detected wave and said second reference wave to generate a second detected wave representative of the said phase variation due to said angular motion and substantially free of said arbitrary phase modulation, with accompanying amplification due to the use of the said second reference wave.

45. Apparatus according to claim 43, in which the said means to superpose the phase inverted wave upon the wave paths includes a variable reactance device incorporated in at least one of said wave paths to vary the phase therein.

46. An inertial reference device comprising, in combination,
   (a) means to maintain a pair of waves in wave paths wherein the respective waves are unequally affected by a given angular motion of said paths,
   (b) phase demodulating means,
   (c) means to impress upon said phase demodulating means a first input wave representing the difference between said waves when said waves are combined in substantial phase opposition, said input wave bearing a phase modulation due to said angular motion, and
   (d) means to impress upon said phase demodulating means a second input wave which constitutes a reference wave, whereby said phase demodulating means develops a signal wave representative of said phase modulation, and in which said phase demodulating means develops a signal wave comprising a sequence of recurring pulses of like polarity, and together with means to integrate said signal wave over a period of time into a relatively large response representative of a relatively small angular motion of said paths.

47. Apparatus according to claim 46, together with means to utilize said relatively large response to produce a reverse rotation of said paths in order to maintain a substantially stable attitude of the inertial reference device.

48. An inertial reference device comprising, in combination,
   (a) means to maintain a pair of waves in wave paths wherein the respective waves are unequally affected by a given angular motion of said paths,
   (b) phase demodulating means,
   (c) means to impress upon said phase demodulating means a first input wave representing the difference between said waves when said waves are combined in substantial phase opposition, said input wave bearing a phase modulation due to said angular motion, and
   (d) means to impress upon said phase demodulating means a second input wave which constitutes a reference wave, whereby said phase demodulating means develops a signal wave representative of said phase modulation, together with means operative upon first mentioned said pair of waves before the same are subjected to said phase demodulation to multiply the phase difference between said waves, thereby to produce over a period of time a signal wave comprising one or more cycles of variation representative of angular motion of said paths.

49. Apparatus according to claim 48, together with means to count cycles of said signal wave, whereby there is developed a digital representation of the said angular motion.

50. An inertial reference device comprising, in combination,
   (a) means to maintain a pair of waves in wave paths wherein the respective waves are unequally affected by a given angular motion of said paths,
   (b) phase demodulating means,
   (c) means to impress upon said phase demodulating means a first input wave representing the difference between said waves when said waves are combined in substantial phase opposition, said input wave bearing a phase modulation due to said angular motion, and
   (d) means to impress upon said phase demodulating means a second input wave which constitutes a reference wave, whereby said phase demodulating means develops a signal wave representative of said phase modulation, together with means operative upon each of said first mentioned pair of waves before the same are subjected to said phase demodulation to multiply the frequency of each said wave by a common factor in order to multiply by the same factor the phase difference between said waves, whereby said phase demodulating means produces a signal wave which passes through one or more complete cycles at an accelerated rate because of said frequency multiplication and is representative of the phase relationship between said first mentioned pair of waves.

51. Apparatus according to claim 50, together with means to count cycles of said signal wave, whereby there is developed a digital representation of the said angular motion of said paths.

52. Apparatus according to claim 51, together with means to identify the sense of the said phase modulation in order to determine whether a given counted cycle shall be added to or subtracted from the accumulated count, whereby the said digital representation is made to follow the accumulated angular displacement of said paths.

53. Apparatus according to claim 52, together with means actuated by said cycle counting means for producing a reverse rotation of said paths in order to maintain a substantially stable attitude of the inertial reference device.

54. An inertial reference device comprising, in combination,
   (a) means to maintain a pair of waves in wave paths wherein the respective waves are unequally affected by a given angular motion of said paths,
   (b) phase demodulating means,
   (c) means to impress upon said phase demodulating means a first input wave representing the difference between said waves when said waves are combined in substantial phase opposition, said input wave bearing a phase modulation due to said angular motion, and
   (d) means to impress upon said phase demodulating means a second input wave which constitutes a reference wave, whereby said phase demodulating means develops a signal wave representative of said phase modulation, and in which said wave paths comprise a pair of sensing coils mounted upon a shaft passing through a common diameter of said coils, and means to rotate said shaft at a substantially constant rate, whereby an additional phase variation is introduced into said first mentioned pair of waves, said additional phase variation having a periodicity determined by the rate of rotation of said shaft.

55. An inertial reference device comprising, in combination,
 (a) means to maintain a pair of waves in wave paths wherein the respective waves are unequally affected by a given angular motion of said paths,
 (b) phase demodulating means,
 (c) means to impress upon said phase demodulating means a first input wave representing the difference between said waves when said waves are combined in substantial phase opposition, said input wave bearing a phase modulation due to said angular motion, and
 (d) means to impress upon said phase demodulating means a second input wave which constitutes a reference wave, whereby said phase demodulating means develops a signal wave representative of said phase modulation, together with individual phase multiplying means connected to a respective point on each said path to multiply the phase difference between the respective waves at said point, and cycle-counting means actuated by said phase demodulating means for digitalizing the amount of phase difference variations.

56. An inertial reference device comprising, in combination,
 (a) means to maintain a pair of waves in wave paths wherein the respective waves are unequally affected by a given angular motion of said paths,
 (b) phase demodulating means,
 (c) means to impress upon said phase demodulating means a first input wave representing the difference between said waves when said waves are combined in substantial phase opposition, said input wave bearing a phase modulation due to said angular motion, and
 (d) means to impress upon said phase demodulating means a second input wave which constitutes a reference wave, whereby said phase demodulating means develops a signal wave representative of said phase modulation, and in which the said waves are electromagnetic waves and said wave paths comprise resistance windings connected in the configuration of a Wheatstone bridge, the waves in any two adjacent windings of said bridge being directed in opposite direction to the waves in the respective diagonally opposite winding, whereby said angular motion of said paths has an unbalancing effect on the bridge, and in which the output wave from the bridge is impressed upon said phase demodulating means.

57. Apparatus according to claim 56, together with means actuated by said phase demodulating means for imparting a reverse rotation to said paths.

58. An inertial reference device comprising, in combination,
 (a) means to maintain a pair of waves in wave paths wherein the respective waves are unequally affected by a given angular motion of said paths,
 (b) phase demodulating means,
 (c) means to impress upon said phase demodulating means a first input wave representing the difference between said waves when said waves are combined in substantial phase opposition, said input waves bearing a phase modulation due to said angular motion, and
 (d) means to impress upon said phase demodulating means a second input wave which constitutes a reference wave, whereby said phase demodulating means develops a signal wave representative of said phase modulation, in which said paths are substantially coincident, forming a single common wave path, and in which said first mentioned pair of waves travel in opposite directions around said common wave path, combining directly therein to form a wave pattern, and in which the said waves are electromagnetic waves and in which at least one amplifying element is connected in said wave path.

59. Apparatus according to claim 58, in which said wave amplifying element is a laser.

60. Apparatus according to claim 58, in which said wave amplifying element is a maser.

61. Apparatus according to claim 58, in which there is a plurality of said amplifying elements, together with means to adjust the respective conductances of the said wave amplifying elements to substantial equality, whereby reflected waves due to conductance inequalities are substantially eliminated.

62. Apparatus according to claim 58, together with a plurality of said amplifying elements and together with tuning means connected to said wave path, whereby reflected waves due to reactance irregularities of the wave path are substantially eliminated.

63. An inertial reference device comprising, in combination,
 (a) a means to maintain a pair of waves in wave paths wherein the respective waves are unequally affected by a given angular motion of said paths,
 (b) phase demodulating means,
 (c) means to impress upon said phase demodulating means a first input wave representing the difference between said waves when said waves are combined in substantial phase opposition, said input wave bearing a phase modulation due to said angular motion, and
 (d) means to impress upon said phase demodulating means a second input wave which constitutes a reference wave, whereby said phase demodulating means develops a signal wave representative of said phase modulation, together with means including a source of a reference wave to superpose upon said first mentioned pair of waves an additional predetermined phase modulation, means to perform a substantially square law detection operation upon said difference representative wave, means to combine the said square-law detected wave with said reference wave in the said phase demodulating means, whereby there is obtained a phase demodulated wave that is substantially proportional in amplitude to the amplitude of said reference wave and to the amplitude of the effect due to said angular motion, thereby effecting an amplification of the response of the device to the said angular motion.

64. In an inertial reference device having means to direct electromagnetic waves in opposite directions over wave paths that are substantially coincident and substantially closed, causing the energy of the transmitted waves to travel past the same part of the respective path more than once, said paths essentially bounding an extended area, and having supporting means for said wave directing means that is subject to angular motion about an axis which has a component perpendicular to said area, the method which comprises the steps of:
 (a) in the absence of any material angular motion of said supporting means about said axis adjusting said oppositely directed waves to equal frequency and to nearly equal amplitudes which latter differ by an amount that is a factor K times the amplitude of one of said waves, where K is a very small number compared to unity,
 (b) differentially combining said waves to generate a difference wave therefrom,
 (c) then subjecting said supporting means to angular motion about said axis, whereby when said angular motion causes the said original waves to differ in phase by a number of radians that is comparable to the number K, a relatively large phase shift occurs in said difference wave,
 (d) in the presence of said angular motion detecting phase variations in said difference wave, (e) determining the sense of said angular motion from said detected phase variations in the difference wave, and, (f) utilizing a detected relatively large phase variation of said difference wave to produce a reverse rotation of said supporting means.

65. In an inertial reference device having means to direct electromagnetic waves in opposite directions over wave paths that are substantially coincident and substantially closed, said paths essentially bounding an extended area, and having supporting means for said wave directing means that is subject to angular motion about an axis which has a component perpendicular to said area, the method which comprises the steps of:

(a) in the absence of any material angular motion of said supporting means about said axis adjusting said oppositely directed waves to equal frequency and to nearly equal amplitudes which latter differ by an amount that is a factor K times the amplitude of one of said waves, where K is a very small number compared to unity, (b) differentially combining said waves to generate a difference wave therefrom, (c) then subjecting said supporting means to angular motion about said axis, whereby when said angular motion causes the said original waves to differ in phase by a number of radians that is comparable to the number K, a relatively large phase shift occurs in said difference wave, (d) in the presence of said angular motion detecting phase variations in said difference wave, and (e) utilizing a detected relatively large phase variation of said difference wave to produce a reverse rotation of said supporting means, in which the difference in phase angle between the said difference wave and said original waves is in the range from 45 degrees to 90 degrees for a phase difference of less than $10^{-8}$ degrees between said original waves.

66. An inertial reference device comprising, in combination, (a) means to maintain a pair of waves in wave paths wherein the respective waves are unequally affected by a given angular motion of said paths, (b) phase demodulating means, (c) means to impress upon said phase demodulating means a first input wave representing the difference between said waves when said waves are combined in substantial phase opposition, said input wave bearing a phase modulation due to said angular motion, and (d) means to impress upon said phase demodulating means a second input wave which constitutes a reference wave, whereby said phase demodulating means develops a signal wave representative of said phase modulation, and in which said first mentioned pair of waves are light waves from a single light beam, together with a beam splitting device by which waves in the beam are directed in opposite directions over said paths, said beam splitting device comprising a pair of non-regular pentagonal prisms in optical contact with each other along one similar face, one prism being inverted with respect to the other in a skew-symmetrical arrangement, at least one of said faces in optical contact with each other being partially reflecting and partially transmitting for a light beam, and a pair of parallel similar faces of the respective prisms being substantially completely reflecting.

67. An inertial reference device comprising, in combination, (a) means to maintain a pair of waves in wave paths wherein the respective waves are unequally affected by a given angular motion of said paths, (b) phase demodulating means, (c) means to impress upon said phase demodulating means a first input wave representing the difference between said waves when said waves are combined in substantial phase opposition, said input waves bearing a phase modulation due to said angular motion, and (d) means to impress upon said phase demodulating means a second input wave which constitutes a reference wave, whereby said phase demodulating means develops a signal wave representative of said phase modulation, in which said paths are substantially coincident, forming a single common wave path, and in which said first mentioned pair of waves travel in opposite directions around said common wave path, combining directly therein to form a wave pattern, and together with an auxiliary transmission line adjacent to and coupled to said common wave path along the length of said auxiliary line, said auxiliary line being terminated substantially non-reflectively at both ends, and means positioned substantially midway between the ends of said auxiliary line for sustaining traveling waves in said auxiliary line, said waves traveling in both directions from the position of said wave sustaining means, whereby the said coupling between said wave path and said auxiliary line is made substantially uni-directional so that a wave traveling in one direction is induced in said common wave path from the portion of the auxiliary line on one side of said position of the wave sustaining means and a traveling wave in the opposite direction is induced in said common wave path from the remaining portion of the auxiliary line, thereby setting up a standing wave in said common wave path.

68. An inertial reference device comprising, in combination, (a) means to maintain a pair of waves in wave paths wherein the respective waves are unequally affected by a given angular motion of said paths, (b) phase demodulating means, (c) means to impress upon said phase demodulating means a first input wave representing the difference between said waves when said waves are combined in substantial phase opposition, said input waves bearing a phase modulation due to said angular motion, and (d) means to impress upon said phase demodulating means a second input wave which constitutes a reference wave, whereby said phase demodulating means develops a signal wave representative of said phase modulation, in which said paths are substantially coincident, forming a single common wave path, and in which said first mentioned pair of waves travel in opposite directions around said common wave path, combining directly therein to form a wave pattern, and together with means located respectively at points in said common wave path spaced apart a quarter wavelength along said path for picking up a wave, amplifying it and impressing the amplified wave upon the said common wave path at a point spaced one-half wavelength from the pickup point in such respective phases as to sustain a standing wave pattern in said common wave path, said phase demodulating device being positioned substantially at a nodal point of said standing wave pattern to detect a shift in the said nodal point relative to said common wave path due to angular motion of said supporting means about said axis.

69. In an inertial reference device having means to direct electromagnetic waves in opposite directions over a common wave path for waves in both said directions thereby forming a standing wave pattern in said path, said path essentially bounding an extended area, said device having supporting means for said wave path subject to angular motion about an axis which has a component perpendicular to said area, and said path being provided with wave reflection reducing means, the method comprising vibrating said supporting means about said axis while adjusting said reflection reducing devices, and simultaneously detecting phase variations due to said vibrations occurring substantially at a null point of said standing wave pattern, whereby a maximum of detected phase variation indicates a minimum of residual wave reflections that interfere with the degree of nulling of said waves at said null point.

70. An inertial reference device comprising, in combination,
(a) means to maintain a pair of waves in wave paths wherein the respective waves are unequally affected by a given angular motion of said paths,
(b) phase demodulating means,
(c) means to impress upon said phase demodulating means a first input wave representing the difference between said waves when said waves are combined in substantial phase opposition, said input waves bearing a phase modulation due to said angular motion, and
(d) means to impress upon said phase demodulating means a second input wave which constitutes a reference wave, whereby said phase demodulating means develops a signal wave representative of said phase modulation, in which said paths are substantially coincident, forming a single common wave path, and in which said first mentioned pair of waves travel in opposite directions around said common wave path, combining directly therein to form a wave pattern, and together means incorporated in said common wave path for reducing wave reflections in said path, supporting means for said wave path, and means to vibrate said supporting means in angular motion about an axis having a component perpendicular to the plane of said path; and in which said phase demodulating means is positioned to detect a phase change in a standing wave pattern present in said common wave path, said phase change being due to said vibrations, whereby the standing wave pattern may be adjusted to a maximum degree of nulling by adjusting said wave reflection reducing means to obtain a maximum of detected phase change.

71. An inertial reference device comprising in combination,
(a) means to maintain a pair of waves in wave paths wherein the respective waves are unequally affected by a given angular motion of said paths,
(b) phase demodulating means,
(c) means to impress upon said phase demodulating means a first input wave representing the difference between said waves when said waves are combined in substantial phase opposition, said input wave bearing a phase modulation due to said angular motion, and
(d) means to impress upon said phase demodulating means a second input wave which constitutes a reference wave, whereby said phase demodulating means develops a signal wave representative of said phase modulation, together amplitude control means for the wave in one of said wave paths, and means to impress a phase demodulated output component from said phase demodulator upon said amplitude control means in proper polarity to reduce departure of said first mentioned waves from a predetermined desired amplitude ratio.

72. An inertial reference device comprising in combination,
(a) means to maintain a pair of waves in wave paths wherein the respective waves are unequally affected by a given angular motion of said paths,
(b) phase demodulating means,
(c) means to impress upon said phase demodulating means a first input wave representing the difference between said waves when said waves are combined in substantial phase opposite, said input waves bearing a phase modulation due to said angular motion, and
(d) means to impress upon said phase demodulating means a second input wave which constitutes a reference wave, whereby said phase demodulating means develops a signal wave representative of said phase modulation, in which said paths are substantially coincident, forming a single common wave path, and in which said first mentioned pair of waves travel in opposite directions around said common wave path, combining directly therein to form a wave pattern, and in which said wave are light waves; together with a Kerr cell inserted in said common wave path, means to apply a periodic voltage across a pair of electrodes in said cell to impart a phase modulation to the light waves passing therethrough in each direction, and means to synchronize the phase modulations in waves that have passed through said cell in opposite directions, said means comprising means to adjust the frequency of said periodic voltage so that the oppositely directed waves arrive at the cell substantially 90 degrees different in phase.

73. An inertial reference device comprising, in combination,
(a) means to maintain a pair of waves in wave paths wherein the respective waves are unequally affected by a given angular motion of said paths,
(b) phase demodulating means,
(c) means to impress upon said phase demodulating means a first input wave representing the difference between said waves when said waves are combined in substantial phase opposition, said input waves bearing a phase modulation due to said angular motion, and
(d) means to impress upon said phase demodulating means a second input wave which constitutes a reference wave, whereby said phase demodulating means develops a signal wave representative of said phase modulation, in which said paths are substantially coincident, forming a single common wave path, and in which said first mentioned pair of waves travel in opposite directions around said common wave path, combining directly therein to form a wave pattern, and in which said waves are light waves; together with a Kerr cell inserted in said common wave path, said cell having four spaced plates each bounding one of four sides of a control space in said cell in which the light waves are accommodated, together with means to impress a modulating voltage across each pair of opposing plates, whereby the plane of polarization of the light waves may have a random inclination to the plates while permitting the light waves to recieve the desired phase shift regardless of the particular plane of polarization.

74. An inertial reference device comprising in combination,
(a) means to circulate electromagnetic waves in both directions simultaneously around a closed loop path, which waves are subject to unlike fnequency changes due to angular motion of said path, said loop path in the absence of such angular motion comprising substantially an integral number of wavelengths for said waves,
(b) a plurality of wave amplifying means coupled to said loop path at points spaced apart by a quarter wavelength for maintaining said waves in circulation, whereby nodes appear in said loop at points spaced apart by a half wavelength, said nodes being substantially midway between adjacent coupling points of said amplifying means, and whereby points of maximum and minimum amplitude appear substantially midway between said nodes,
(c) means coupled to said loop path at said nodes to derive a difference wave,
(d) means coupled to said loop path at said points of maximum and minimum amplitude to derive a sum wave,
(e) a phase demodulating means for detecting frequency differences between said oppositely circulating waves, (f) means actuated by said difference wave to impress a first input wave upon said phase demodulating means, (g) means actuated by said sum wave to impress a second input wave upon said phase demodulating means along with said first input wave, and (h) means to utilize a phase demodulated output wave from said phase demodulator.

75. Apparatus according to claim 74, together with means including a phase shifter for adjusting the phase of said second input wave.

76. Apparatus according to claim 75, in which the said phase shifter provides a phase shift of substantially 90 degrees.

77. An intertial reference device comprising in combination, (a) means to circulate waves in both directions simultaneously around a closed wave-transmission path, said path causing the energy of the respective transmitted waves to travel past the same part of the said path more than once, which waves are subject to unlike frequency changes due to angular motion of said path, said path in the absence of such angular motion comprising substantially an integral number of wavelengths for said waves, and (b) means to detect a frequency difference between said oppositely circulating waves, whereby to detect said angular motion of said path.

78. An inertial reference device comprising, in combination, means to transmit a wave, a closed, wave-transmission path for causing the energy of the transmitted wave to travel past the same part of said path more than once, means to circulate energy repeatedly around said path simultaneously in opposite directions, said energy being in the form of a pair of waves, each said wave being characterized by a frequency, the said oppositely directed waves being subject to unlike frequency changes due to angular motion of said path about a given sensitive axis, and means connected to said path to detect a phase difference between said waves.

79. An inertial reference device in accordance with claim 78, in which the said frequencies are equal in the absence of said angular motion.

80. An inertial reference device in accordance with claim 78, in which the said means to circulate energy comprises a negative resistance element.

81. An inertial reference device in accordance with claim 78, in which the said energy is impressed upon the said path continuously over the major portion of the path.

82. An inertial reference device comprising, in combination, means to transmit energy in the form of waves, two closed wave transmission paths, each said path being for causing the energy of the transmitted waves to travel past the same part of the respective path more than once, individual means incorporated in each said path to circulate energy repeatedly around the respective path, each said wave being characterized by a frequency, the waves in the respective paths being subject to unlike frequency changes due to angular motion of the respective path about a given sensitive axis, and means connected to both said paths at a particular point in each path to detect a phase difference between the waves at said points due to said frequency changes.

83. An inertial reference device in accordance with claim 82, in which the said paths are substantially coincident in space, though distinct.

84. An inertial reference device in accordance with claim 82, in which the said waves are oppositely directed in the respective paths with respect to said sensitive axis.

85. An inertial reference device in accordance with claim 82, in which the said frequencies are equal in the absence of said angular motion.

86. In an inertial reference device, in combination, a closed transmission loop, means to set up a standing wave pattern in said loop, and means to detect a shift in the position of said standing wave pattern along said loop, which shift is due to an angular motion of said loop about a given sensitive axis.

87. In an inertial reference device, in combination, a closed transmission loop, means to set up a standing wave pattern in said loop characterized by null points at certain points in said loop, and means to detect a shift in the position of a said null point along said loop, which shift is due to an angular motion of said loop about a given sensitive axis.

88. In an inertial reference device, in combination, a common wave path for light waves traversing said path in opposite directions, a Kerr cell in said common path, means to apply a periodic voltage across a pair of electrodes in said cell to impart a phase modulation to the light waves passing therethrough in each direction, whereby a double frequency is introduced into said phase modulation, a phase demodulator, means to impress upon said demodulator a reference wave at said double frequency, whereby signals carried by said light waves due to rotation of said common path about a sensitive axis are detected and are distinguished from spurious signals not phase modulated in said Kerr cell.

89. Apparatus according to claim 88, together with means to integrate signals detected by said phase demodulator.

90. In an inertial reference device, in combination, means to transmit waves, a closed wave-transmission path for causing the energy of the transmitted wave to travel past the same part of said path more than once, means to circulate waves in said path in opposite directions around said path, means to detect a phase difference between said waves traveling in said opposite directions when said path is rotated about a sensitive axis, and means to identify the sense of the said phase difference.

91. In rotation responsive apparatus, in combination, means to generate a pair of waves differently affected by rotation of their respective transmission paths, means to differentially combine said waves to generate a difference wave therefrom, said difference wave containing a phase modulation due to said rotation, means including a reference carrier wave source to superpose upon said original waves an additional predetermined phase modulation, means to detect from said difference wave a wave of the same frequency as said reference carrier wave and bearing a phase modulation due to the said rotation, and phase demodulating means for combining said detected wave with said reference carrier wave, whereby there is obtained a detected wave that is proportional in amplitude to said reference carrier wave and bears said phase modulation, thereby effecting an amplification of the response of the said apparatus to the said phase modulation due to the said rotation.

92. An inertial reference device comprising, in combination, means to circulate energy in a closed wave-transmission path, said path causing the energy of the transmitted wave to travel past the same part of said path more than once, means to detect a relativistic effect in said path due to rotation of said path, and means to utilize said detected effect to establish the desired inertial reference.

93. Apparatus according to claim 92, in which the energy circulated is in the form of electromagnetic energy.

94. Apparatus according to claim 92, in which the energy circulated is in the form of electromagnetic waves.

95. Apparatus according to claim 92, in which the energy circulated is in the form of light.

96. Apparatus according to claim 92, together with means to distinguish in said detected effect the direction of rotation.

97. Apparatus according to claim 92, in which a plurality of wavelengths are included in said loop path.

98. In an inertial reference device, in combination, a source of energy for transmitting a wave, a closed wave-transmission path for causing the energy of the transmitted wave to travel past the same part of said path more than once, means to circulate energy from said source in said path simultaneously in opposite directions around said path, and means to detect a relativistic effect due to said circulation of energy in said two directions around said path during rotation of said path.

99. In an inertial reference device, in combination, a source of waves, a closed wave-transmission path for causing the waves to travel past the same part of said path more than once, means to circulate waves from said source in said path in opposite directions around said path, and means to detect a phase difference between said waves traveling in opposite directions when said path is rotated.

100. Apparatus according to claim 99, in which said source of waves comprises a laser.

101. Apparatus according to claim 99, in which said source of waves comprises a maser.

102. In rotation responsive apparatus, in combination, means to generate a pair of waves differently affected by rotation of their respective transmission paths, whereby a phase difference is developed between said waves, means operative upon each of said waves separately to multiply the frequency of each said wave by a common factor in order to multiply by the same factor the said phase difference of said frequency-multiplied waves without changing the phase relationship therebetween, phase demodulating means, means to impress upon said phase demodulating means a first input wave representing the difference between said phase multiplied waves when said waves are combined in substantial phase opposition, said input wave bearing a phase modulation due to said multiplied phase difference, and means to impress upon said phase demodulating means a second input wave representating the sum of said phase multiplied waves to constitute a reference wave, whereby said phase demodulating means produces a signal wave which is representative of the phase relationship between said phase multiplied waves.

References Cited

UNITED STATES PATENTS

| | | | |
|---|---|---|---|
| 2,678,580 | 5/1954 | Erban | 88—1 |
| 2,749,793 | 6/1956 | White | 88—1 |
| 2,152,807 | 4/1939 | Klingsporn | 88—61 |
| 3,060,807 | 10/1962 | Huston | 88—61 |
| 3,035,482 | 5/1962 | Kinder | 88—14 |
| 3,065,663 | 11/1962 | Donnelly et al. | 88—14 |
| 2,887,662 | 5/1959 | Maudench | 332—16 |
| 2,920,289 | 1/1960 | Meyer | 332—16 |
| 2,872,580 | 2/1959 | Horowitz et al. | 331—132 |
| 2,891,160 | 6/1959 | Leblond | 331—132 |
| 2,938,669 | 5/1960 | Henry | 331—132 |
| 3,070,306 | 12/1962 | DuBois | 235—179 |
| 2,934,267 | 4/1960 | Wirkler et al. | 235—151 |
| 3,049,294 | 8/1962 | Newell | 235—151 |
| 2,281,552 | 5/1942 | Barrow | 333—95 |
| 2,416,790 | 3/1947 | Barrow | 333—73 |
| 2,768,357 | 10/1956 | Lyons | 333—82 |
| 2,000,058 | 5/1935 | Ball | 88—1 |
| 2,256,538 | 9/1941 | Alford | 336—125 X |
| 2,838,733 | 6/1958 | Longfellow | 324—83 |
| 3,218,871 | 11/1965 | Dressler et al. | 73—505 |

OTHER REFERENCES

Savant et al., Principles of Inertial Navigation, McGraw-Hill, 1961 (pp. 94, 95 and 109).

MARTIN P. HARTMAN, *Primary Examiner.*